(12) United States Patent
Zhou

(10) Patent No.: US 9,203,485 B2
(45) Date of Patent: Dec. 1, 2015

(54) COMMUNICATION SYSTEM, COMMUNICATIONS DEVICE, AND ANTENNA ELEMENT ARRANGEMENT METHOD

(71) Applicant: FUJITSU LIMITED, Kawasaki-shi, Kanagawa (JP)

(72) Inventor: Liang Zhou, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/244,508

(22) Filed: Apr. 3, 2014

(65) Prior Publication Data

US 2014/0355706 A1 Dec. 4, 2014

(30) Foreign Application Priority Data

May 31, 2013 (JP) ................................. 2013-115575

(51) Int. Cl.
*H04B 7/04* (2006.01)
(52) U.S. Cl.
CPC .................................... *H04B 7/0413* (2013.01)
(58) Field of Classification Search
None
See application file for complete search history.

(56) References Cited

U.S. PATENT DOCUMENTS

| 6,252,560 | B1* | 6/2001 | Tanaka et al. ................ 343/853 |
| 2002/0085643 | A1* | 7/2002 | Kitchener et al. ............ 375/267 |
| 2006/0148429 | A1 | 7/2006 | Inogai et al. |
| 2007/0243831 | A1* | 10/2007 | Seki ................................. 455/69 |
| 2008/0026697 | A1* | 1/2008 | Signell et al. ................ 455/66.1 |
| 2009/0041149 | A1* | 2/2009 | Sarris et al. ................... 375/267 |
| 2009/0135078 | A1* | 5/2009 | Lindmark et al. ............ 343/844 |
| 2009/0296846 | A1* | 12/2009 | Maru ............................. 375/267 |
| 2010/0015922 | A1* | 1/2010 | Kawai .......................... 455/63.1 |
| 2010/0135203 | A1* | 6/2010 | Maru ............................. 370/328 |
| 2010/0150013 | A1* | 6/2010 | Hara et al. ..................... 370/252 |
| 2010/0283702 | A1* | 11/2010 | Lindmark et al. ............ 343/810 |
| 2011/0269488 | A1* | 11/2011 | Lee et al. ....................... 455/500 |
| 2014/0073337 | A1* | 3/2014 | Hong et al. ................. 455/452.1 |
| 2014/0192923 | A1* | 7/2014 | Matsuo et al. ................ 375/296 |

FOREIGN PATENT DOCUMENTS

JP 2012-182804 A 9/2012
JP 2012-253709 A 12/2012

(Continued)

*Primary Examiner* — Daniel Washburn
*Assistant Examiner* — Berhanu Tadese
(74) *Attorney, Agent, or Firm* — Arent Fox LLP

(57) ABSTRACT

A communication system includes a transmitter that includes $N_t$ transmission antenna elements that are arranged in a row, and transmits a signal by a space division multiplexing scheme, and a receiver that includes $N_r$ reception antenna elements that are arranged in a row, and receives a signal by the space division multiplexing scheme, wherein a distance between first and second transmission antenna elements from an end position is different from a distance between the second and third transmission antenna elements from the end position, the $N_t$ transmission antenna elements including the first, second and third antenna elements, and a distance between first and second reception antenna elements from an end position is different from a distance between the second and third transmission antenna elements from the end position, the $N_r$ transmission antenna elements including the first, second and third antenna elements.

10 Claims, 26 Drawing Sheets

(56) References Cited

FOREIGN PATENT DOCUMENTS

| WO | WO 2004/059876 | A1 | 7/2004 |
| WO | WO 2006/070478 | A1 | 7/2006 |
| WO | WO 2008/059985 | A1 | 5/2008 |
| WO | WO 2008/099964 | A1 | 8/2008 |
| WO | WO 2008/146494 | A1 | 12/2008 |
| WO | WO 2009/017230 | A1 | 2/2009 |

* cited by examiner

FIG. 3

| f | R | N = 2 | N = 3 | N = 4 |
|---|---|---|---|---|
| 60 GHz | 5 m | d = 11.1 cm | d = 9.1 cm | d = 7.9 cm |
| | 500 m | d = 1.12 m | d = 0.91 m | d = 0.79 m |
| 83 GHz | 1000 m | d = 1.34 m | d = 1.09 m | d = 0.95 m |

FIG. 26

| $d_{12}$ | 0.25d | 0.3d | 0.33d | 0.4d | 0.5d | 0.6d | 0.7d |
|---|---|---|---|---|---|---|---|
| N=4 | × (FIG. 14) | — | △ (FIG. 18) | — | ◎ (FIG. 4) | — | — |
| N=5 | × (FIG. 15) | — | △ (FIG. 19) | — | ◎ (FIG. 6) | — | — |
| N=6 | — | × (FIG. 16) | — | ○ (FIG. 20) | ◎ (FIG. 7) | ○ (FIG. 22) | ○ (FIG. 24) |
| N=7 | — | × (FIG. 17) | — | ○ (FIG. 21) | ◎ (FIG. 8) | ○ (FIG. 23) | ○ (FIG. 25) |

COMMUNICATION SYSTEM, COMMUNICATIONS DEVICE, AND ANTENNA ELEMENT ARRANGEMENT METHOD

CROSS-REFERENCE TO RELATED APPLICATION

This application is based upon and claims the benefit of priority of the prior Japanese Patent Application No. 2013-115575, filed on May 31, 2013, the entire contents of which are incorporated herein by reference.

FIELD

The embodiments discussed herein are related to a communication system, a communication device, an antenna element arrangement method, and the like.

BACKGROUND

In a technical field of radio communication, a space division multiplexing (SDM) scheme is often used in order to increase an information amount that is allowed to be transmitted or received at the same time. The SDM scheme is achieved by a multiple input multiple output (MIMO) scheme in which a plurality of antenna elements are used in each of a transmitter and a receiver (for example, see Japanese Laid-open Patent Publication No. 2012-253709).

In addition, there is a strong demand in the market for performing high-speed radio communication in a millimeter wave band having abundant available spectrums. The communication through the millimeter wave band is performed in a line-of-sight (LOS) environment because the signal wavelength is short. Thus, from a viewpoint of high-speed large-capacity communication or the like, it is conceivable that communication is performed by the MIMO scheme in the LOS environment using the millimeter wave band. The communication scheme may be used for various pieces of radio communication, and for example, it is desirable that such a communication scheme is used for communication between fixed communication stations such as communication between base stations in a mobile communication system, back-haul communication, and communication with a relay station. This is because the LOS-MIMO scheme allows the communication between communication stations to be performed at high speed even in a situation in which it is difficult to lay a cable between the communication stations. Such a situation includes, for example, a case in which communication is performed across a river and a case in which communication is performed at a certain location in the event of a disaster.

In the LOS-MIMO scheme of the related art, a plurality of antenna elements that are included in each of a transmitter and a receiver are disposed in a row (in a straight line) at equal intervals by a certain distance d. The distance d is represented by "$d=\sqrt{(\lambda R/N)}$", where "R" represents a range between the transmitter and the receiver (range between the antenna element in the transmitter and the antenna element in the receiver), "$\lambda$," represents a wavelength of a signal to be transmitted or received, and "N" represents the number of antenna elements. In a case in which the plurality of antenna elements are arranged at equal intervals by the distance d in each of the transmitter and the receiver, when the range between the transmitter and the receiver is the range R or is within a certain extent that includes the range R, the transmitter and the receiver may perform communication with an appropriate quality. Such extent corresponds to a communication guaranteed range in which communication with an appropriate quality is guaranteed between the transmitter and the receiver.

For a transmitter and a receiver that communicate with each other across a range R' outside of the communication guaranteed range, it is desirable that the design is started over. That is, it is desirable that an appropriate distance d' between the antenna elements, which corresponds to the range R', is calculated, and the antenna elements are arranged at equal intervals by the distance d'. The recalculation of the distance between the antenna elements, the rearrangement of the antenna elements, and the like, are time-consuming and troublesome. Thus, from a viewpoint to avoid such time and trouble, it is desirable that the communication guaranteed range is wide. When the communication guaranteed range is wide, the flexibility in arrangement of the transmitter and the receiver is high. However, in the case of the transmitter and the receiver in the LOS-MIMO scheme of the related art, the communication guaranteed range is not sufficiently wide, and locations for arranging the transmitter and the receiver are quite limited undesirably.

SUMMARY

According to an aspect of the embodiments, a communication system includes a transmitter that includes $N_t$ transmission antenna elements that are arranged in a row, and transmits a signal by a space division multiplexing scheme, and a receiver that includes $N_r$ reception antenna elements that are arranged in a row, and receives a signal by the space division multiplexing scheme, wherein a distance between first and second transmission antenna elements from an end position is different from a distance between the second and third transmission antenna elements from the end position, the $N_t$ transmission antenna elements including the first, second and third antenna elements, and a distance between first and second reception antenna elements from an end position is different from a distance between the second and third transmission antenna elements from the end position, the $N_r$ transmission antenna elements including the first, second and third antenna elements.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating numerical examples of reference distance d;

FIG. 26 is a diagram illustrating the simulation results that are illustrated in FIGS. 4, 6 to 8, and 14 to 25 and are classified from a viewpoint of the antenna element distance $d_{12}$ and the number of antenna elements N.

DESCRIPTION OF EMBODIMENTS

The embodiments are described below with reference to the accompanying drawings from the following viewpoint.

1. Communication system
2. Simulation results
3. Antenna element arrangement method
4. First modification (position that forms a non-uniform distance)
5. Second modification (variable parameter $\alpha$)

The embodiments are not limited to those using the classification of these items, and the classification of these items is made for the convenience of description.

<1. Communication System>

Figure 1:
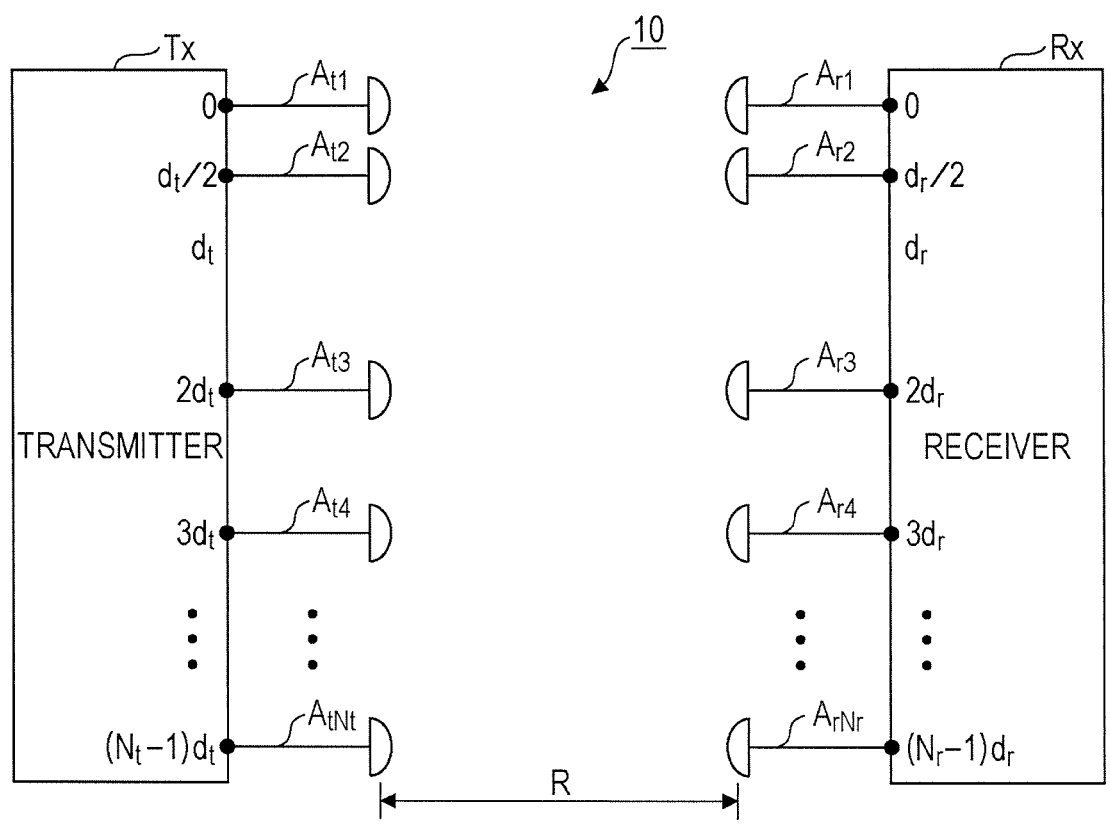
FIG. 1 is a diagram illustrating a communication system according to an embodiment.

FIG. 1 is a diagram illustrating a communication system 10 according to an embodiment. The communication system 10 includes a transmitter Tx and a receiver Rx. Difference between the transmitter Tx and the receiver Rx is relative and the transmitter Tx is referred to when focusing on a function on the transmitting side in a communication device, and the receiver Rx is referred to when focusing on a function on the receiving side in the communication device. The transmitter Tx includes $N_t$ antenna elements $A_{t1}$ to $A_{tNt}$ that are disposed or arranged in a row in a straight line. Here, the number of antenna elements $N_t$ corresponds to four as an example, but the embodiments are not limited to such an example. The appropriate certain number ($N_t$) of antenna elements, which corresponds to three or more, may be used. Each of the antenna elements $A_{t1}$ to $A_{tNt}$ is typically a parabolic antenna or a horn antenna, but any appropriate type of an antenna may be used depending on the usage. The antenna elements $A_{t1}$ to $A_{tNt}$ that are disposed in a row are located at coordinates or positions that are respectively represented as 0, $d_t/2$, $2d_t$, $3d_t$, ..., and $(N_t-1)d_t$ when the coordinate of the antenna element $A_{t1}$ is set at 0. Here, "$d_t$" represents a reference distance that is determined from the number of antenna elements $N_t$, a wavelength $\lambda$ of a signal to be transmitted, and a range R between the transmitter Tx and the receiver Rx. For example, "$d_t=\sqrt{(\lambda R/N_t)}$" is satisfied. If the $N_t$ antenna elements $A_{t1}$ to $A_{tNt}$ are disposed at equal intervals by the distance $d_t$, these coordinates respectively correspond to 0, $d_t$, $2d_t$, $3d_t$, ..., and $(N_t-1)d_t$. In the embodiments, as illustrated in FIG. 1, note that the position of the second antenna element $A_{t2}$ from the end position corresponds to the position of "$d_t/2$", differently from the case in which the antenna elements are disposed at equal intervals. Therefore, a distance between the first and second antenna elements from the end position is "$d_t/2$", a distance between the second and third antenna elements from the end position is "$3d_t/2$", a distance between the third and fourth antenna elements from the end position is "$d_t$", and a distance between the subsequent continuous antenna elements is also "$d_t$".

The receiver Rx also includes $N_r$ antenna elements $A_{r1}$ to $A_{rNr}$ that are disposed or arranged in a row in a straight line. Here, the number of $N_r$ antenna elements corresponds to four as an example, but the embodiment is not limited to such an example. The appropriate certain number ($N_r$) of antenna elements, which corresponds to three or more, may be used. Each of the antenna elements $A_{r1}$ to $A_{rNr}$ is typically a parabolic antenna or a horn antenna, but any appropriate type of an antenna may be used depending on the usage. The antenna elements $A_{r1}$ to $A_{rNr}$ that are disposed in a row are located at the coordinates or positions that are respectively represented as 0, $d_r/2$, $2d_r$, $3d_r$, ..., and $(N_r-1)d_r$ when the coordinate of the antenna element $A_{r1}$ is set at 0. Here, "$d_r$" represents a reference distance that is determined from the number of antenna elements $N_r$, a wavelength $\lambda$ of the signal to be transmitted, and the range R between the transmitter Tx and the receiver Rx. For example, "$d_r=\sqrt{(\lambda R/N_r)}$" is satisfied. If the $N_r$ antenna elements $A_{r1}$ to $A_{rNr}$ are disposed at equal intervals by the distance $d_r$, these coordinates respectively correspond to 0, $d_r$, $2d_r$, $3d_r$, ..., and $(N_r-1)d_r$. In the embodiments, as illustrated in FIG. 1, note that the position of the second antenna element $A_{r2}$ from the end position corresponds to the position of "dr/2", differently from the case in which the antenna elements are disposed at equal intervals. Therefore, a distance between the first and second antenna elements from the end position is "$d_r/2$", a distance between the second and third antenna elements from the end position is "$3d_r/2$", a distance between the third and fourth antenna elements from the end position is "$d_r$", and a distance between the subsequent continuous antenna elements is also "$d_r$".

A range in which the transmitter and the receiver are arranged under a condition that communication having an appropriate quality is guaranteed may be extended as compared with the range in the related art by setting a distance between the first and second antenna elements from the end position to "$d_r/2$" in the transmitter Tx, and setting a distance between the first and second antenna elements from the end position to "$d_r/2$" in the receiver Rx. That is, flexibility of the arrangement of the transmitter and the receiver may be made high by extending the communication guaranteed range. In the example illustrated in FIG. 1, one of the antenna elements $A_{t1}$ and $A_{tNt}$ may be used as the first antenna element from among the antenna elements $A_{t1}$ to $A_{tNt}$ that are arranged in a row in the transmitter Tx. Similarly, one of the antenna elements $A_{r1}$ and $A_{rNr}$ may be used as the first antenna element from among the antenna elements $A_{r1}$ to $A_{rNr}$ that are disposed in a row in the receiver Rx. Such a point is described in a first modification.

The transmitter Tx and the receiver Rx communicate with each other across the range R. To be exact, the range R is a distance between an antenna element $A_{ti}$ in the transmitter Tx and an antenna element $A_{rj}$ in the receiver Rx (i, j=1, 2, 3, ...), but is referred to as the range between the transmitter Tx and the receiver Rx as long as there is no risk of confusion. The range R may have, for example, a value of a few centimeters to a few meters, but the embodiments are not limited to those using such a specific numerical value, and any appropriate numerical value may be used.

The transmitter Tx and the receiver Rx are typically base stations each of which are fixed to a certain location, but may be certain appropriate communication devices. Here, it is desirable that the transmitter Tx and the receiver Rx perform transmission and reception of a signal in accordance with an appropriate communication scheme by the SDM scheme in the LOS environment. Here, the communication may be performed in the complete LOS environment, or communication may be performed in an environment in which some reflected waves exist but the LOS environment is dominant. The SDM scheme is achieved by a MIMO scheme or a multi-antenna system.

Typically, the communication scheme that is used for communication between the transmitter Tx and the receiver Rx is a code division multiple access (CDMA) scheme, an orthogonal frequency division multiplexing (OFDM) scheme, a single-carrier frequency division multiple access (SC-FDMA) scheme, or the like, but any appropriate communication scheme may be used. Typically, a signal that is to be transmitted and received belongs to a millimeter wave band in which the frequency corresponds to 30 GHz to 300 GHz (the wavelength ranges from 1 mm to 10 mm), but a signal that belongs to another band may be employed. For example, a sub-millimeter wave band in which the frequency corresponds to 300 GHz to 3000 GHz (the wavelength ranges from 0.1 mm to 1 mm), a quasi-millimeter wave band in which the frequency corresponds to 10 GHz to 30 GHz (the wavelength ranges from 10 mm to 30 mm), or the like, may be employed.

The transmitter Tx divides an information sequence to be transmitted into a plurality of streams, and transmits the plurality of streams through the plurality of antenna elements $A_{t1}$ to $A_{tNt}$. The receiver Rx executes signal separation processing or signal detection processing for signals that are received through the plurality of antenna elements $A_{r1}$ to $A_{rNr}$, and restores the information sequence that has been transmitted from the transmitter Tx. The signal separation processing or the signal detection processing corresponds to, for example, a zero forcing (ZF) method, a minimum mean square error (MMSE) method, a succession interference cancelation (SIC) method, a QR decomposition with M algorithm-maximum likelihood detection (QRM-MLD), or the like, but the embodiments are not limited to such examples.

<2. Simulation Result>

Figure 2:
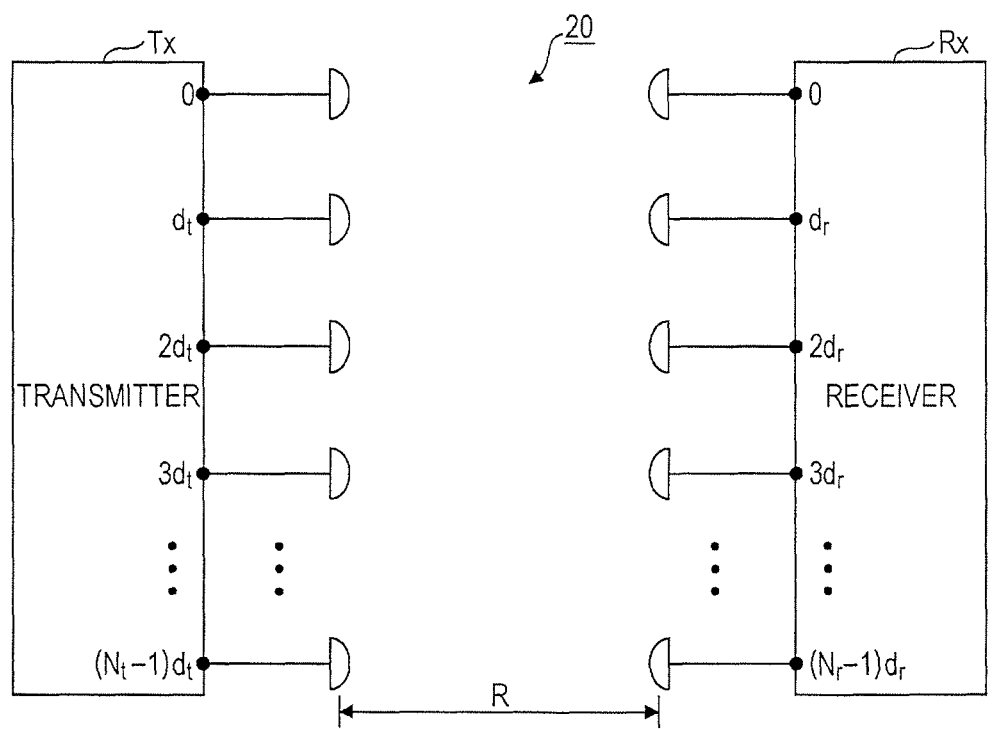
FIG. 2 is a diagram illustrating a communication system in which a plurality of antenna elements are provided at equal intervals in each of a transmitter and a receiver.

A simulation result that is related to the communication system illustrated in FIG. 1 is described below. For comparison, a simulation result that is related to a communication system (FIG. 2) in which a plurality of antenna elements in each of a transmitter and a receiver are disposed at equal intervals is also illustrated. For convenience of description, as illustrated in FIG. 1, the communication system in which the position of the second antenna element from the end position forms a non-uniform distance is referred to as the "non-uniform system". On the other hand, as illustrated in FIG. 2, the communication system 20 in which all antenna elements are disposed at equal intervals is referred to as the "uniform system". As described above, the reference distance d when the plurality of antenna elements are disposed at equal intervals is determined from the number of antenna elements N ($N=N_t$ or $N_r$), the wavelength $\lambda$ of a signal to be transmitted or received, and the range R between the transmitter Tx and the receiver Rx, and for example, "$d=\sqrt{(\lambda R/N)}$" is satisfied.

FIG. 3 is a diagram illustrating numerical examples of reference distances d. The second row in FIG. 3 indicates a reference distance d when a frequency f is 60 GHz and the range R is 5 m for the number of antenna elements N (N=2, 3, and 4). The third row in FIG. 3 indicates a reference distance d when the frequency f is 60 GHz and the range R is 500 m for the number of antenna elements N (N=2, 3, and 4). The fourth row in FIG. 3 indicates a reference distance d when the frequency f is 83 GHz and the range R is 1000 m for the number of antenna elements N (N=2, 3, and 4). As the number of antenna elements N is increased, the reference distance d is decreased. In addition, as the range R is increased, the reference distance d is also increased.

Figure 4:
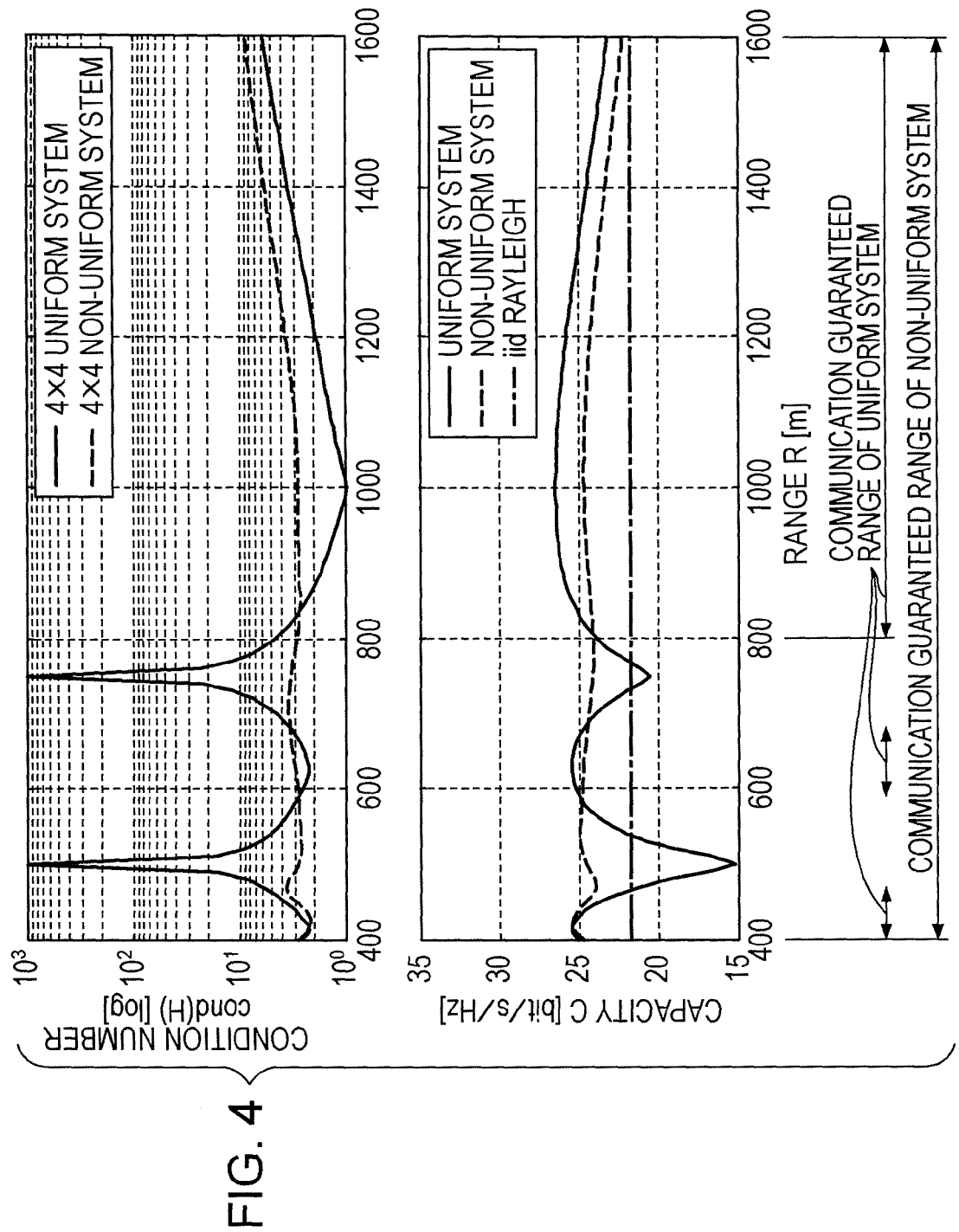
FIG. 4 is a diagram illustrating a condition number and a capacity when both of the number of antenna elements $N_t$ in the transmitter and the number of antenna elements $N_r$ in the receiver correspond to four ("$d_{12}=0.5d$" and "N=4")

FIG. 4 is a diagram illustrating a condition number and a capacity for the uniform system and the non-uniform system when both of the number of antenna elements $N_t$ in the transmitter and the number of antenna elements $N_r$ in the receiver correspond to four. A distance $d_{12}$ between the first and second antenna elements from the end position is half (d/2) as compared with the case in which the antenna elements are arranged at equal intervals. The condition number cond(H) corresponds to an amount that is defined as represented by the following formula.

$$cond(H) = \frac{\sqrt{\lambda_{max}(H)}}{\sqrt{\lambda_{min}(H)}} \tag{1}$$

Here, "H" indicates a channel matrix that indicates a state of a radio channel between the transmitter Tx and the receiver Rx. A matrix element of the channel matrix indicates a channel impulse response $h_{ij}$ between one antenna element $A_{ti}$ in the transmitter Tx and one antenna element $A_{rj}$ in the receiver Rx. In addition, "$\lambda_{max}(H)$" indicates the maximum eigenvalue of a correlation matrix $H^H H$ or $HH^H$. Here, "H superscript" indicates conjugate transpose. In addition, "$\lambda_{min}(H)$" indicates the minimum eigenvalue of the correlation matrix $H^H H$ or $HH^H$.

As represented in the formula (1), the condition number cond(H) depends on the magnitude relation between the $\lambda_{max}(H)$ and the $\lambda_{min}(H)$. The eigenvalue $\lambda_i$ (i=1, 2, . . . ) indicates appropriateness of the state of the radio channel. An information amount that is allowed to be transmitted through a radio channel that corresponds to a small eigenvalue $\lambda_i$ is small, and an information amount that is allowed to be transmitted through a radio channel that corresponds to a large eigenvalue $\lambda_i$ is large. Thus, MIMO multiplexing is performed effectively using a plurality of channels when radio channel states that respectively correspond to a plurality of eigenvalues are appropriate to the same extent. This means that the condition number cond(H) is close to 1.

On the contrary, when the condition number cond(H) is large, there exists a large eigenvalue and a small eigenvalue, and not much information is allowed to be transmitted through the radio channel that corresponds to the small eigenvalue, so that the radio channel does not serve as an appropriate propagation path. Therefore, an information amount that is allowed to be transmitted by MIMO multiplexing when the condition number cond(H) is large is smaller than an information amount that is allowed to be transmitted by MIMO multiplexing when the condition number cond(H) is small. Whether the condition number cond(H) is large or small may be determined from any appropriate reference, and as an example, may be determined based on whether the condition number cond(H) is larger than 10.

A capacity C is defined by the following formula.

$$C = \sum_{i=1}^{min(N_r, N_t)} \log_2\left(1 + \frac{\rho}{N_t}\lambda_i\right) \quad (2)$$

Here, "$\rho$" is signal-to-noise ratio (SNR). As the capacity C becomes large, throughputs that are obtained in the whole communication system become large, and as the capacity C becomes small, throughputs that are obtained in the whole communication system become small.

As illustrated in FIG. 4, in the case of the uniform system, when the range R between the transmitter Tx and the receiver Rx is "800 m≤R≤1.1600 m", the condition number becomes a small value that is 10 or less. In such a range, the capacity C becomes a relatively high value and exceeds a capacity in a case of independent and identically distributed Rayleigh (iid Rayleigh). Particularly, when the range R is 1000 m, the condition number becomes 1, and the capacity C indicates the maximum value, so that it is indicated that the communication may be performed in an optimal state. This is because the distance d between the antenna elements in the uniform system is designed so that "R=1000 m" is satisfied.

However, when the range R is around 800 m or less ("R≤800 m"), the condition number cond(H) may become a value more than 10, and particularly, when the range R is 750 m and 500 m, the condition number cond(H) indicates a peak. In such a range R, the capacity C becomes a small value. In addition, when the range R is around 600 m or 400 m, the condition number cond(H) becomes smaller than 10, and the capacity C exceeds the capacity in the case of the independent and identically distributed Rayleigh (iid Rayleigh). Thus, in the case of the uniform system, a range in the communication may be performed with an appropriate quality (communication guaranteed range) is "800 m≤R≤1600 m" (or "R≅400 m or 600 m"). The determination of appropriateness of the radio channel state based on whether the condition number is 10 or less is a merely example, and appropriateness of the radio channel state may be determined from the condition number having a value other than 10.

On the other hand, in the case of the non-uniform system, when the range R is "400 m≤R≤1600 m", the condition number becomes a small value that is 10 or less, and the capacity C exceeds the capacity in the case of the independent and identically distributed Rayleigh (iid Rayleigh). As described above, the range R in which communication with an appropriate quality may be guaranteed (communication guaranteed range) may be extended from "800 m≤R≤0.1600 m" (or "R=600 m or 400 m") to "400 m≤R≤1600 m" by setting a distance between the first and second antenna elements from the end position to "d/2" that is different from the distance in the case in which the antenna elements are arranged at equal intervals. Therefore, the transmitter Tx and the receiver Rx may perform appropriate SDM communication on a range R that is a certain value in "400 m≤R≤1600 m".

Figure 5:
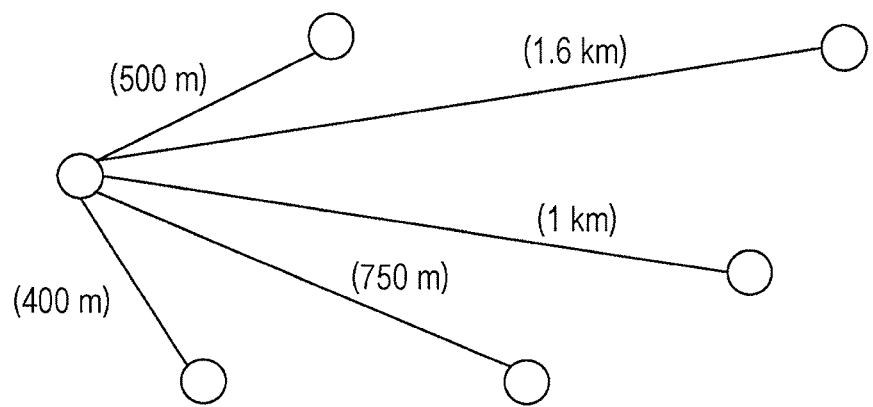
FIG. 5 is a schematic diagram illustrating a positional relationship between a transmitter Tx and a receiver Rx in which appropriate SDM communication is allowed to be performed by the non-uniform system.

FIG. 5 is a schematic diagram illustrating a positional relationship between the transmitter Tx and the receiver Rx in which appropriate SDM communication is allowed to be performed by the non-uniform system. The white circle in FIG. 5 indicates the transmitter Tx or the receiver Rx. In the uniform system, when the range R is 500 m or 750 m, the communication may not be performed with an appropriate quality.

Figure 6:
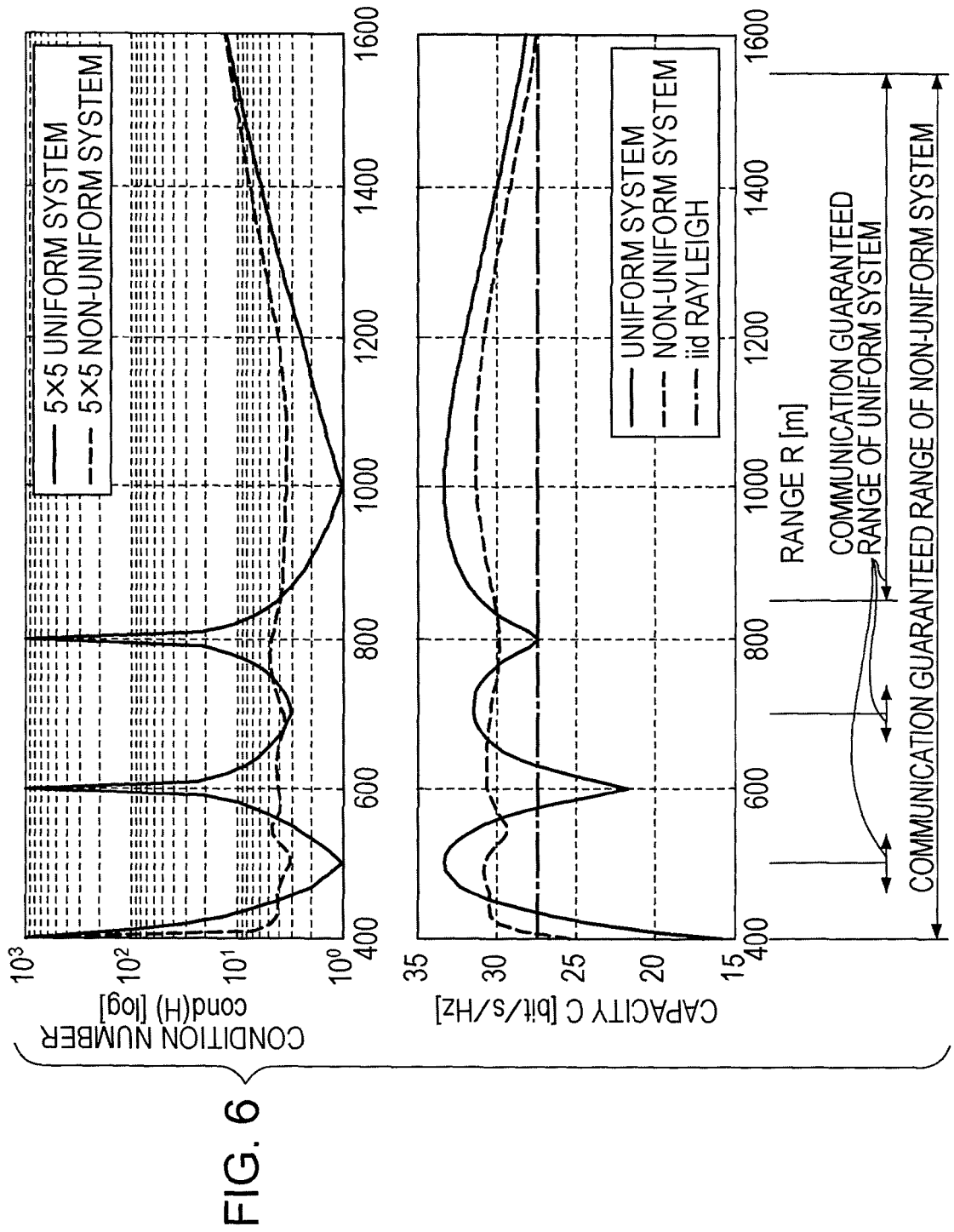
FIG. 6 is a diagram illustrating a condition number and a capacity when both of the number of antenna elements $N_t$ in the transmitter and the number of antenna elements $N_r$ in the receiver correspond to five ("$d_{12}=0.5d$" and "N=5")

FIG. 6 is a diagram illustrating a condition number and a capacity for the uniform system and the non-uniform system when both of the number of antenna elements $N_t$ in the transmitter and the number of antenna elements $N_r$ in the receiver correspond to five. As illustrated in FIG. 6, in the case of the uniform system, when the range R between the transmitter Tx and the receiver Rx is "850 m≤R≤11550 m", the condition number becomes a small value that is 10 or less. In such a range, the capacity C becomes a relatively large value and exceeds the capacity in the case of the independent and identically distributed Rayleigh (iid Rayleigh). Particularly, when the range R is 1000 m, the condition number becomes 1, and the capacity C indicates the maximum value, which indicates that the communication may be performed in the optimal state. This is because the distance d between the antenna elements in the uniform system is designed so that "R=1000 m" is satisfied. However, when the range R is 850 m or less ("R≤1850 m"), there is a case in which the condition number cond(H) becomes a value that is more than 10, and particularly, the condition number cond(H) indicates a peak when the range R is 800 m and 600 m. In such range R, the capacity C becomes a small value. In addition, when the range R is around 700 m or 500 m, the condition number cond(H) becomes small, and the capacity C exceeds the capacity in the case of the independent and identically distributed Rayleigh. Thus, in the case of the uniform system, a range in which the communication may be performed with an appropriate quality (communication guaranteed range) is "850 m≤R≤1550 m" (or "R≅700 m or 500 m").

On the other hand, in the non-uniform system, the condition number becomes a small value that is 10 or less in "410 m≤R≤1550 m", and the capacity C also exceeds the capacity in the case of independent and identically distributed Rayleigh (iid Rayleigh) in "410 m≤R≤1550 m". As described above, by setting the distance between the first and second antenna elements from the end position to "d/2" that is different from the distance in the case in which the antenna elements are arranged at equal intervals, the range R in which the communication with an appropriate quality may be guaranteed (communication guaranteed range) may be extended from "850 m≤R≤1550 m" to "400 m≤R≤1550 m". Therefore, the transmitter Tx and the receiver Rx may perform the appropriate SDM communication on a range R that is a certain value in "410 m≤R≤1550 m".

Figure 7:
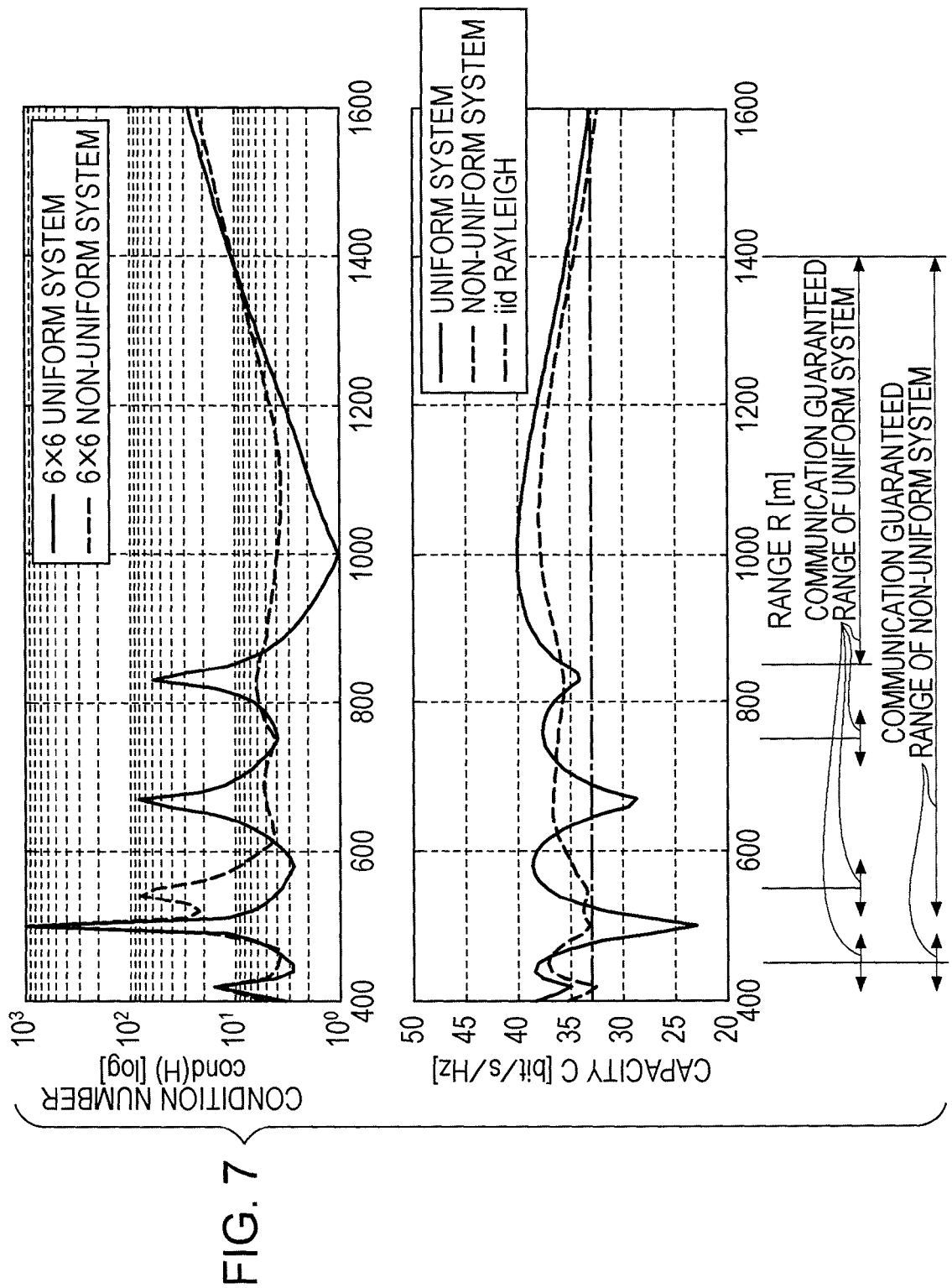
FIG. 7 is a diagram illustrating a condition number and a capacity when both of the number of antenna elements $N_t$ in the transmitter and the number of antenna elements $N_r$ in the receiver correspond to six ("$d_{12}=0.5d$" and "N=6")

FIG. 7 is a diagram illustrating a condition number and a capacity for the uniform system and the non-uniform system when both of the number of antenna elements $N_t$ in the transmitter and the number of antenna elements $N_r$ in the receiver correspond to six. As illustrated in FIG. 7, in the case of the uniform system, when the range R between the transmitter Tx and the receiver Rx is "850 m≤R≤1400 m", the condition number becomes a small value that is 10 or less. In such a range, the capacity C becomes a relatively large value and exceeds the capacity in the case of the independent and identically distributed Rayleigh (iid Rayleigh). Particularly, when the range R is 1000 m, the condition number becomes 1, and the capacity C also indicates the maximum value, which indicates that the communication may be performed in the optimal state. This is because the distance d between the antenna elements in the uniform system is designed so that "R=1000 m" is satisfied. However, when the range R is 850 m or less ("R≤850 m"), there is a case in which the condition number cond(H) becomes a value that is more than 10, and particularly, when the range R is around 830 m, 660 m, and 500 m, the condition number cond(H) indicates a peak. In such a range R, the capacity C becomes a small value. In addition, when range R is around 750 m, 550 m, and 450 m, the condition number becomes 10 or less, and the capacity exceeds the capacity in the case of the independent and identically distributed Rayleigh (iid Rayleigh). Thus, in the case of the uniform system, when the range in which the communication may be performed with an appropriate quality (communication guaranteed range) is "850 m≤R≤1400 m" (or "R≈450 m, 550 m, or 750 m").

On the other hand, in the non-uniform system, the condition number becomes a small value that is 10 or less in "550 m≤R≤1400 m", the capacity C exceeds the capacity in the case of the independent and identically distributed Rayleigh (iid Rayleigh) in "400 m≤R≤1500 m". In addition, when the range R is around 450 m, the condition number becomes 10 or less, and the capacity exceeds the capacity in the case of the independent and identically distributed Rayleigh (iid Rayleigh). As described above, by setting the distance between the first and second antenna elements from the end position to "d/2" that is different from the distance in the case in which the antenna elements are arranged at equal intervals, the range R in which the communication with an appropriate quality may be guaranteed (communication guaranteed range) may be extended from "850 m≤R≤1400 m" (or "R=450, 550 m, or 750 m") to "550 m≤R≤1400 m" (or "R≈450 m"). Therefore, the transmitter Tx and the receiver Rx may perform the appropriate SDM communication on a range R that is a certain value in "550 m≤R≤1400 m" (or "R≈450 m").

Figure 8:
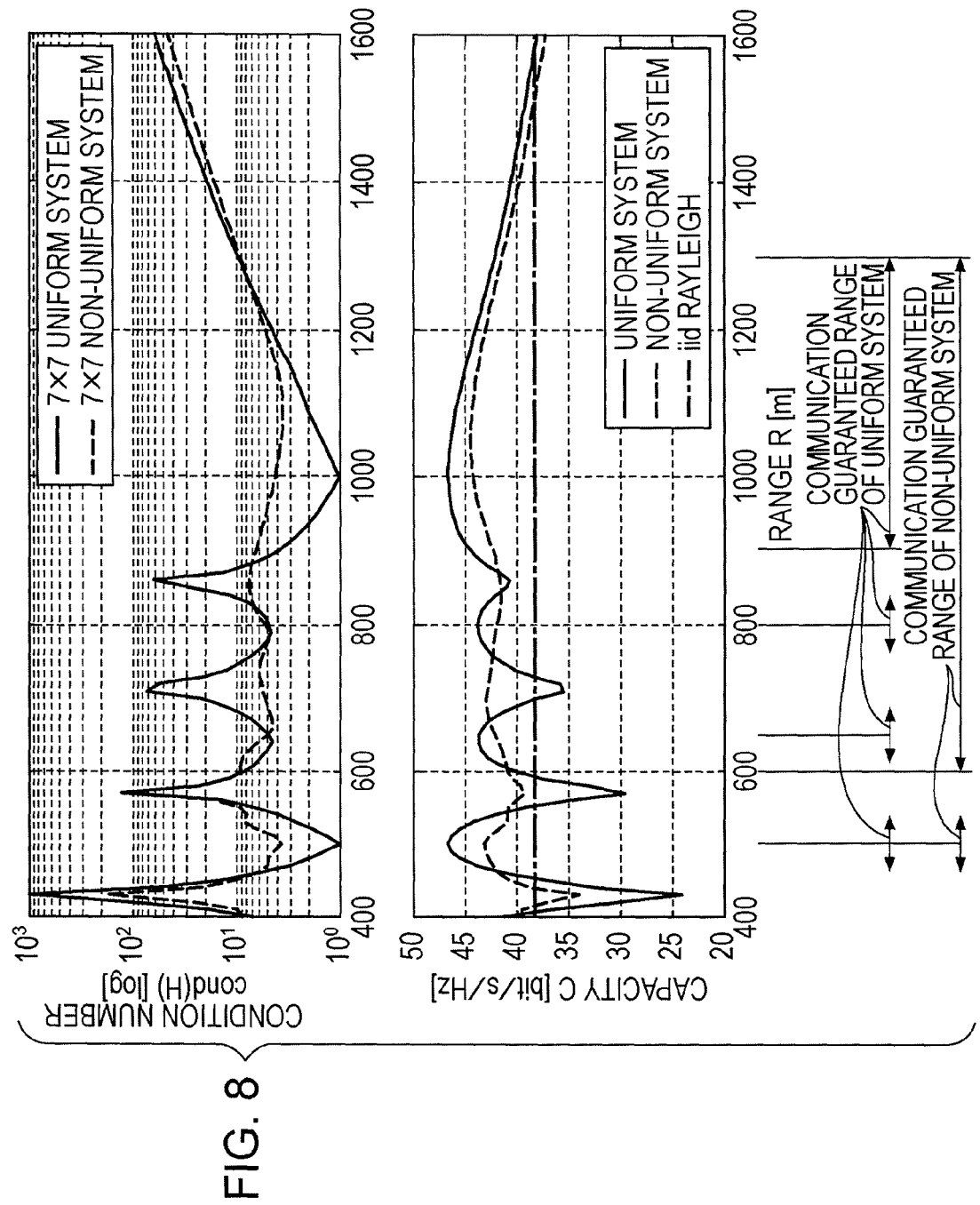
FIG. 8 is a diagram illustrating a condition number and a capacity when both of the number of antenna elements $N_t$ in the transmitter and the number of antenna elements $N_r$ in the receiver correspond to seven ("$d_{12}=0.5d$" and "N=7")

FIG. 8 is a diagram illustrating a condition number and a capacity for the uniform system and the non-uniform system when both of the number of antenna elements $N_t$ in the transmitter and the number of antenna elements $N_r$ in the receiver correspond to seven. As illustrated in FIG. 8, in the case of the uniform system, the range R between the transmitter Tx and the receiver Rx is "900 m≤R≤1300 m", the condition number becomes a small value that is 10 or less. In such a range, the capacity C becomes a relatively large value and exceeds the capacity in the case of the independent and identically distributed Rayleigh (iid Rayleigh). Particularly, when the range R is 1000 m, the condition number becomes 1, and the capacity C also indicates the maximum value, so that it is indicated that the communication may be performed in the optimal state. This is because the distance d between the antenna elements in the uniform system is designed so that "R=1000 m" is satisfied. However, when the range R is 900 m or less ("R≤900 m"), there is a case in which the condition number cond(H) becomes a value that is more than 10, and particularly, when the range R is around 850 m, 710 m, 570 m, and 420 m, the condition number cond(H) indicates a peak. In such a range R, the capacity C becomes a small value. In addition, when the range R is around 800 m, 650 m, or 500 m, the condition number becomes 10 or less, and the capacity exceeds the capacity in the case of the independent and identically distributed Rayleigh (iid Rayleigh). Thus, in the uniform system, the range in which the communication may be performed with an appropriate quality (communication guaranteed range) is "900 m≤R≤1300 m" (or "R≈500 m, 650 m, or 800 m").

On the other hand, in the non-uniform system, the condition number becomes a small value that is 10 or less in "600 m≤R≤1300 m", and the capacity C exceeds the capacity in the case of the independent and identically distributed Rayleigh (iid Rayleigh) in "450 m≤R≤1500 m". In addition, when the range R is around 500 m, the condition number becomes 10 or less, and the capacity exceeds the capacity in the case of the independent and identically distributed Rayleigh (iid Rayleigh). As described above, the range R in which the communication with an appropriate quality may be guaranteed (communication guaranteed range) may be extended from "900 m≤R≤1300 m" (or "R≈500 m, 650 m or 800 m") to "600 m≤R≤1300 m" (or "R≈500 m") by setting the distance between the first and second antenna elements from the end position to "d/2" that is different from the distance in the case in which the antenna elements are arranged at equal intervals. Therefore, the transmitter Tx and the receiver Rx may perform appropriate SDM communication on a range R that is a certain value in "600 m≤R≤1300 m" (or "R≈500 m").

As illustrated in FIGS. 4 to 8, in the non-uniform system in which the distance between the first and second antenna elements from the end position is set to "d/2" that is different from the distance in the case in which the antenna elements are arranged at equal intervals, the range R in which the communication with an appropriate quality may be guaranteed (communication guaranteed range) may be extended. As a result, the flexibility by which the transmitter and the receiver are arranged may be extended.

<3. Antenna Element Arrangement Method>

Figure 9:
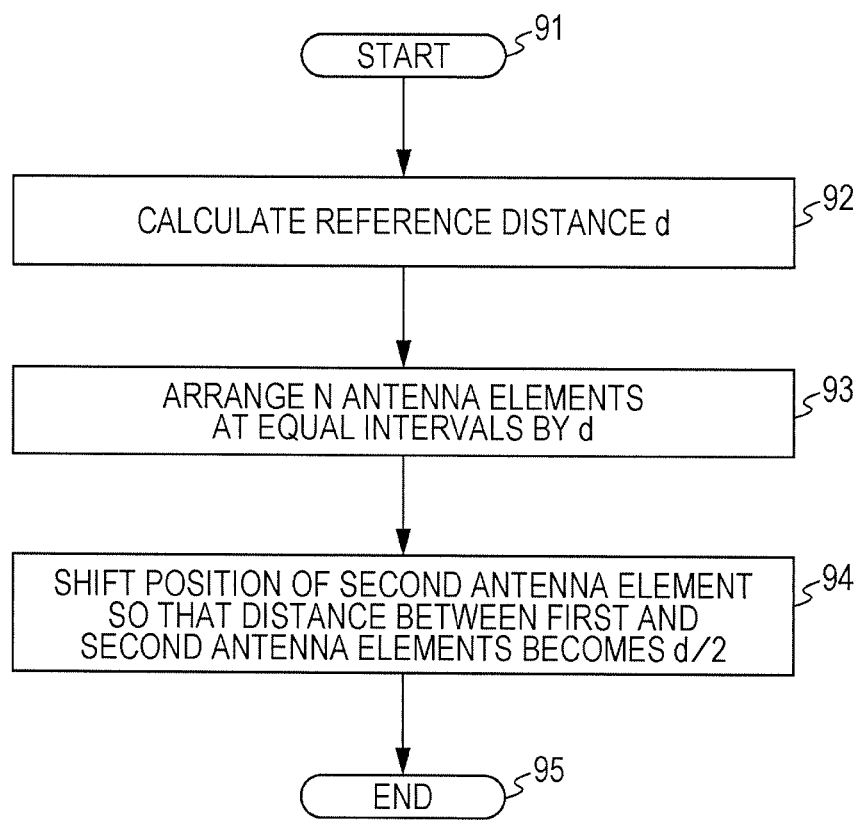
FIG. 9 is a flowchart illustrating an antenna element arrangement method by which a plurality of antenna elements are arranged in a communication station.

FIG. 9 is a flowchart illustrating an antenna element arrangement method by which the N antenna elements in the transmitter or the receiver are arranged. The antenna element arrangement method may be executed by a certain device that performs the design. The antenna element arrangement method illustrated in the flowchart of FIG. 9 may be executed for the transmitter and the receiver, but when the transmitter Tx and the receiver Rx employ the same arrangement, the arrangement of the antenna elements, which is determined for one of the transmitter Tx and the receiver Rx, may be also applied to the other.

The flow starts in Step 91 and proceeds to Step 92.

In Step 92, a reference distance d is calculated from the number of antenna elements N, a wavelength λ of a signal (and "frequency f=c/λ"), and a distance between the transmitter Tx and the receiver Rx. Here, "c" indicates the speed of light. The reference distance d is represented, for example, by "d=√(λR/N)".

In Step 93, the N antenna elements are disposed in a row at equal intervals by a reference distance d.

In Step 94, the position of the second antenna element from the end position is shifted so that a distance between the first and second antenna elements from the end position becomes "d/2" (distance between the second and third antenna elements from the end position becomes "3d/2"). In addition, the flow proceeds to Step 95, and the processing ends.

In the example illustrated in FIG. 9, Step 94 is executed after Step 93, but the embodiments are not limited to such an example. For example, instead of the execution of Step 94 after Step 93, the position of the N antenna elements may be determined all at once so that the distance between the first and second antenna elements from the end position is set to "d/2", and a distance between the third antenna element and the subsequent antenna elements from the end position is set to "d".

<4. First Modification>

In the example illustrated in FIG. 1, the first antenna element corresponds to the antenna element $A_{t1}$ from among the $N_t$ antenna elements in the transmitter Tx, and the first antenna element corresponds to the antenna element $A_{r1}$ from among the $N_r$ antenna elements in the receiver Rx. That is, a non-uniform distance between the first and second antenna elements (and between the second and third antenna elements) from the end position is formed by the antenna elements $A_{t1}$ and $A_{t2}$ in the transmitter Tx and formed by the antenna elements $A_{r1}$ and $A_{r2}$ in the receiver Rx. However, in the embodiment, the first antenna element is not limited to the antenna elements $A_{t1}$ and $A_{r1}$. An antenna element $A_{tNt}$ at the end position from among the antenna elements that are disposed in a row in the transmitter Tx may be employed as the first antenna element. In addition, an antenna element $A_{rNr}$ at the end position from among the antenna elements that are disposed in a row in the receiver Rx may be employed as the first antenna element. Thus, there are four cases based on whether the first antenna element in the transmitter Tx corresponds to the antenna element $A_{t1}$ or $A_{tNt}$ that is located at the end position, and whether the first antenna element in the receiver Rx corresponds to the antenna element $A_{r1}$ or $A_{rNr}$ that is located at the end position.

Figure 10:
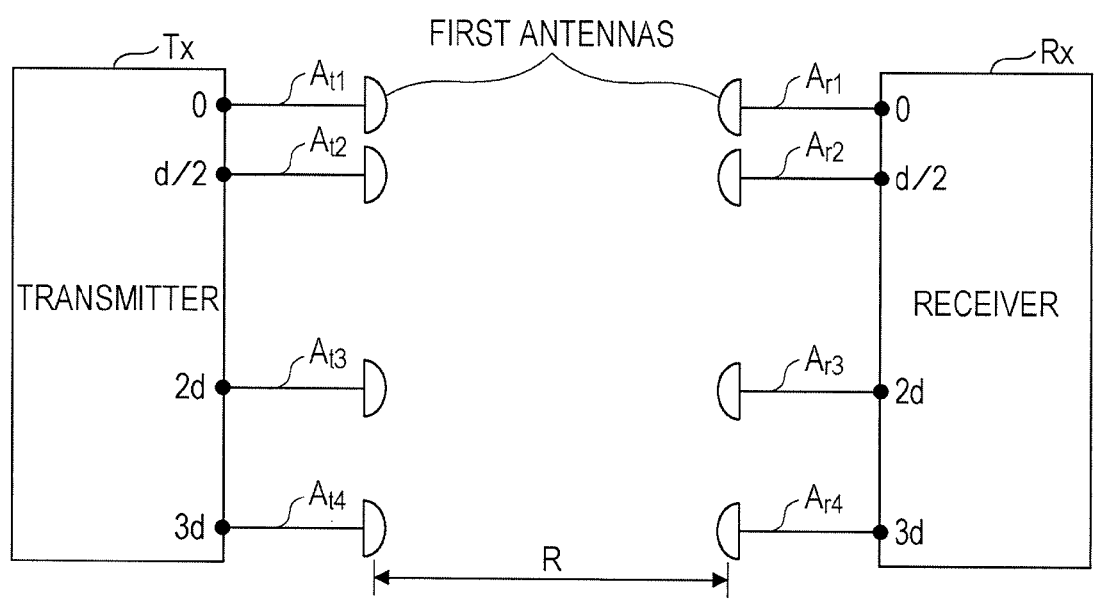
FIG. 10 is a diagram illustrating an example in which an antenna element $A_{t1}$ from among the antenna elements in the transmitter Tx indicates the first antenna element, and an antenna element $A_{r1}$ from among the antenna elements in the receiver Rx indicates the first antenna element.

FIG. 10 is a diagram illustrating an example in which the antenna element $A_{t1}$ from among the antenna elements in the transmitter Tx indicates the first antenna element, and the antenna element $A_{r1}$ from among the antenna elements in the receiver Rx indicates the first antenna element. The location of the first antenna element is the same as that of the example illustrated in FIG. 1, but for the convenience of description, "$N_t=N_r=4$" is satisfied here. The reference distance d is represented as $\sqrt{(\lambda R/N)}$. In such an example, when the position of the antenna element $A_{t1}$ is set at 0, the coordinates of the antenna elements in the transmitter Tx respectively correspond to 0, d/2, 2d, and 3d. When it is assumed that the number of antenna elements is N, the coordinates of the antenna elements in the transmitter Tx respectively correspond to 0, d/2, 2d, ..., (N−2)d, and (N−1)d. When the position of the antenna element $A_{r1}$ is set at 0, the coordinates of the antenna elements in the receiver Rx respectively correspond to 0, d/2, 2d, and 3d. When it is assumed that the number of antenna elements is N, the coordinates of antenna elements in the receiver Rx respectively correspond to 0, d/2, 2d, (N−2)d, and (N−1)d.

Figure 11:
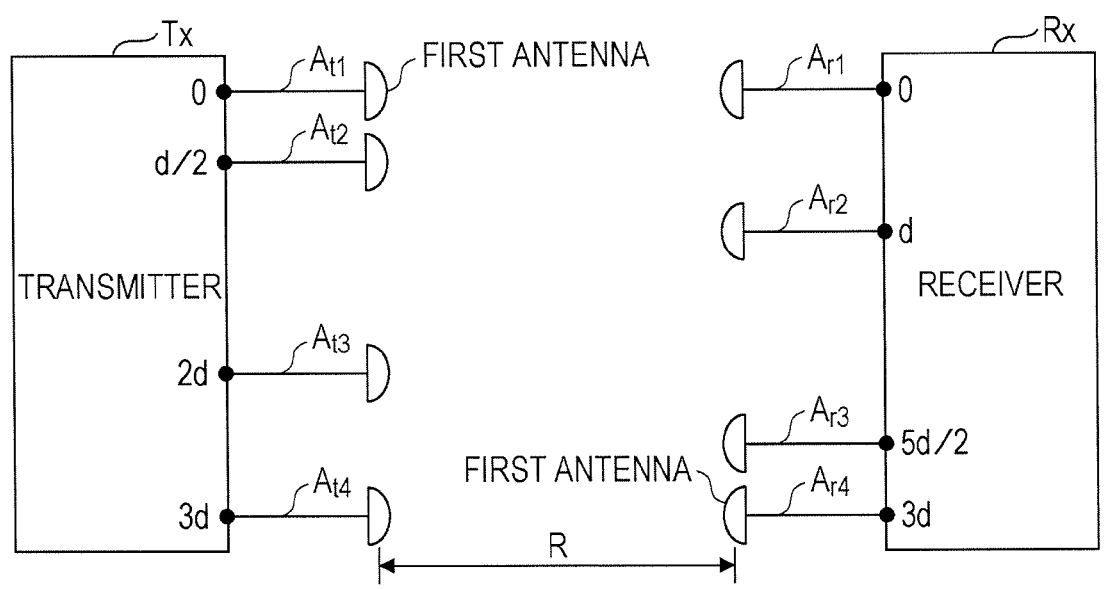
FIG. 11 is a diagram illustrating an example in which the antenna element $A_{t1}$ from among the antenna elements in the transmitter Tx indicates the first antenna element, and an antenna element $A_{r4}$ from among the antenna elements in the receiver Rx indicates the first antenna element.

FIG. 11 is a diagram illustrating an example in which the antenna element $A_{t1}$ from among the antenna elements in the transmitter Tx indicates the first antenna element, and the antenna element $A_{r4}$ from among the antenna elements in the receiver Rx indicates the first antenna element. In such an example, when the position of the antenna element $A_{t1}$ is set at 0, the coordinates of the antenna elements in the transmitter Tx respectively correspond to 0, d/2, 2d, and 3d. When it is assumed that the number of antenna elements is N, the coordinates of the antenna elements in the transmitter Tx respectively correspond to 0, d/2, 2d, ..., (N−2)d, and (N−1)d. When the position of the antenna element $A_{r1}$ is set at 0, the coordinates of the antenna elements in the receiver Rx respectively correspond to 0, d, 5d/2, and 3d. When it is assumed that the number of antenna elements is N, the coordinates of the antenna elements in the receiver Rx respectively correspond to 0, d, 2d, ..., (N−2+1/2)d, and (N−1)d.

Figure 12:
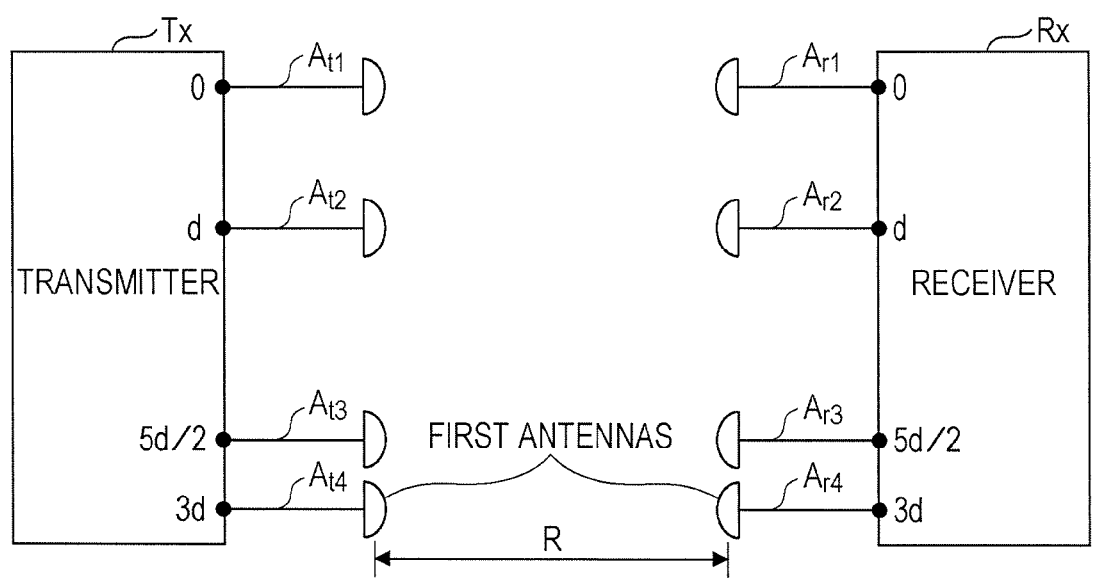
FIG. 12 is a diagram illustrating an example in which an antenna element $A_{t4}$ from among the antenna elements in the transmitter Tx indicates the first antenna element, and the antenna element $A_{r4}$ from among the antenna elements in the receiver Rx indicates the first antenna element.

FIG. 12 is a diagram illustrating an example in which the antenna element $A_{t4}$ from among the antenna elements in the transmitter Tx indicates the first antenna element, and the antenna element $A_{r4}$ from among the antenna elements in the receiver Rx indicates the first antenna element. In such an example, when the position of the antenna element $A_{t1}$ is set at 0, the coordinates of the antenna elements in the transmitter Tx respectively correspond to 0, d, 5d/2, and 3d. When it is assumed that the number of antenna elements is N, the coordinates of the antenna elements in the transmitter Tx respectively correspond to 0, d, 2d, ..., (N−2+1/2)d, and (N−1)d. When the position of the antenna element $A_{r1}$ is set at 0, the coordinates of the antenna elements in the receiver Rx respectively correspond to 0, d, 5d/2, and 3d. When it is assumed that the number of antenna elements is N, the coordinates of the antenna elements in the receiver Rx respectively correspond to 0, d, 2d, ..., (N−2+1/2)d, and (N−1)d.

Figure 13:
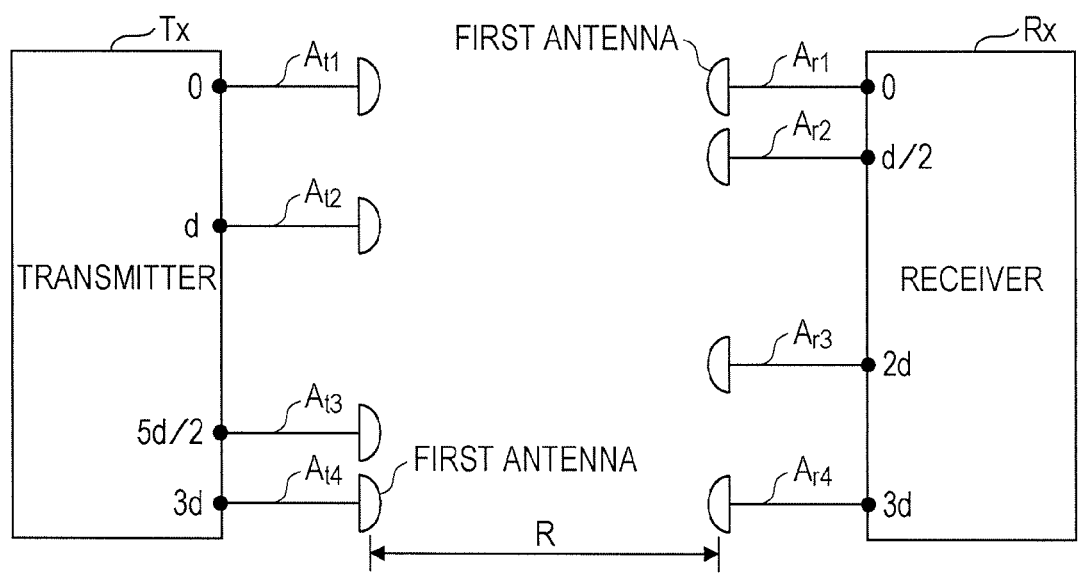
FIG. 13 is a diagram illustrating an example in which the antenna element $A_{t4}$ from among the antenna elements in the transmitter Tx indicates the first antenna element, and the antenna element $A_{r1}$ from among the antenna elements in the receiver Rx indicates the first antenna element.

FIG. 13 is a diagram illustrating an example in which the antenna element $A_{t4}$ from among the antenna elements in the transmitter Tx indicates the first antenna element, and the antenna element $A_{r1}$ from among the antenna elements in the receiver Rx indicates the first antenna element. In such an example, when the position of the antenna element $A_{t1}$ is set at 0, the coordinates of the antenna elements in the transmitter Tx respectively correspond to 0, d, 5d/2, and 3d. When it is assumed that the number of antenna elements is N, the coordinates of the antenna elements in the transmitter Tx respectively correspond to 0, d, 2d, ..., (N−2+1/2)d, and (N−1)d. When the position of the antenna element $A_{r1}$ is set at 0, the coordinates of the antenna elements in the receiver Rx respectively correspond to 0, d/2, 2d, and 3d. When it is assumed that the number of antenna elements is N, the coordinates of the antenna elements in the receiver Rx respectively correspond to 0, d/2, 2d, ..., (N−2)d, and (N−−1)d.

Even in any one of FIGS. 10 to 13, similar to the examples illustrated in FIGS. 4, 6, 7 and 8, a range in which the transmitter and the receiver may be arranged under a condition that an appropriate communication quality is guaranteed (communication guaranteed range) may be extended as compared with the technology in the related art. As a result, the flexibility by which the transmitter and the receiver are arranged may be extended. In FIGS. 10 to 13, the first antenna element from the end position on the transmission side corresponds to the antenna element $A_{t1}$ or $A_{tNt}$, and the first antenna element from the end position on the reception side corresponds to the antenna element $A_{r1}$ or $A_{rNr}$, and a distance between the first and second antenna elements from the end position is d/2, and the coordinates of the antenna elements $A_{t1}$ and $A_{r1}$ are set at the origin point. However, the embodiments are not limited to such setting of the origin point.

<5. Second Modification>

In the above description, the distance between the first and second antenna elements from the end position is "d/2" (distance between the second and third antenna elements from the end position is "3d/2"), and the distance between the other antenna elements is "d", but the embodiments are not strictly limited to the case in which the distance between the antenna elements is "d/2" (or "3d/2") and "d". In a second modification of the embodiment, a distance between the antenna elements is shifted by "$\alpha_i d$" (i=2, . . . , and N−1) (N≥3). Here, "$\alpha_i$" is a variable parameter for the position of the i-th antenna element from the end position, and for example, "−0.2≤$\alpha_i$≤0.2" is satisfied, and preferably, "−0.15≤$\alpha i$≤0.15" is satisfied, and further preferably, "−0.1≤$\alpha_i$≤0.1" is satisfied. The values $\alpha_i$ of variable parameters for the N antenna elements may be different, or two or more values $\alpha_i$ of the variable parameters may be the same, or all of the values $\alpha_i$ may be the same. As described in "4. First modification", the position where a non-uniform distance is provided between the antenna elements corresponds to the position in one of the four cases in FIGS. 10 to 13.

For convenience of description, a variable parameter in the second to ($N_t$−1)-th antenna elements from the end position, from among the $N_t$ antenna elements in the transmitter Tx, is set to $\alpha_i$(i=2, . . . , and $N_t$−1). In addition, a variable parameter in the second to ($N_r$−1)-th antenna elements from the end position, from among the $N_r$ antenna elements in the receiver Rx, is set to $\beta_j$(j=2, . . . , and $N_r$−1). In the case of the arrangement of antenna elements illustrated in FIGS. 1 and 10, when the positions of the antenna elements $A_{t1}$ and $A_{r1}$ are set at 0, the coordinates of the antenna elements in the transmitter Tx and the receiver Rx are as follows.

The transmitter Tx: 0, (1/2+$\alpha_2$)d, (2+$\alpha_3$)d, . . . , ($N_t$−2+$\alpha_{Nt-1}$)d, and ($N_t$−1)d The receiver Rx: 0, (1/2+$\beta_2$)$_d$, (2+$\beta_3$)d, . . . , ($N_r$−2+$\beta_{Nr-1}$)d, and ($N_r$−1)d In the example illustrated in FIG. 11, when the positions of the antenna elements $A_{t1}$ and $A_{r1}$ are set at 0, the coordinates of the antenna elements in the transmitter Tx and the receiver Rx are as follows.

The transmitter Tx: 0, (1/2+$\alpha_2$)d, (2+$\alpha_3$)d, . . . , ($N_t$−2+$\alpha_{Nt-1}$)d, and ($N_t$−1)d The receiver Rx: 0, (1+$\beta_2$)d, (2+$\beta_3$)d, . . . , ($N_r$−2+1/2+$\beta_{Nr-1}$)d and ($N_r$−1)d In the example illustrated in FIG. 12, when the positions of the antenna elements $A_{t1}$ and $A_{r1}$ are set at 0, the coordinates of the antenna elements in the transmitter Tx and the receiver Rx are as follows.

The transmitter Tx: 0, (1+$\alpha_2$)d, (2+$\alpha_3$)d, . . . , ($N_t$−2+1/2+$\alpha_{Nt-1}$)d, and ($N_t$−1)d The receiver Rx: 0, (1+$\beta_2$)d, (2+$\beta_3$)d, . . . , ($N_r$−2+1/2+$\beta_{Nr-1}$)d, and ($N_r$−1)d In the example illustrated in FIG. 13, when the positions of the antenna elements $A_{t1}$ and $A_{r1}$ are set at 0, the coordinates of the antenna elements in the transmitter Tx and the receiver Rx are as follows.

The transmitter Tx: 0, (1+$\alpha_2$)d, (2+$\alpha_3$)d, . . . , ($N_t$−2+1/2+$\alpha_{Nt-1}$)d, and ($N_t$−1)d The receiver Rx: 0, (1/2+$\beta_2$)d, (2+$\beta_3$)d, . . . , ($N_r$−2+$\beta_{Nr-1}$)d, and ($N_r$−1)d For convenience of description, in the simulation, it is assumed that the number of antenna elements $N_t$ in the transmitter Tx and the number of antenna elements $N_r$ in the receiver Rx are equal to N ($N_t$=$N_r$=N). In addition, the variable parameter $\alpha_i$(i=2, . . . , or $N_t$−1) for the transmitter Tx and the variable parameter $\beta_j$(j=2, . . . , or $N_r$−1) for the receiver Rx may be generally different, but for convenience of description, it is assumed that the parameters are the equal value a.

A simulation result of a condition number and a capacity is described below for various values in the variable parameter α and the number of antennas N.

Figure 14:
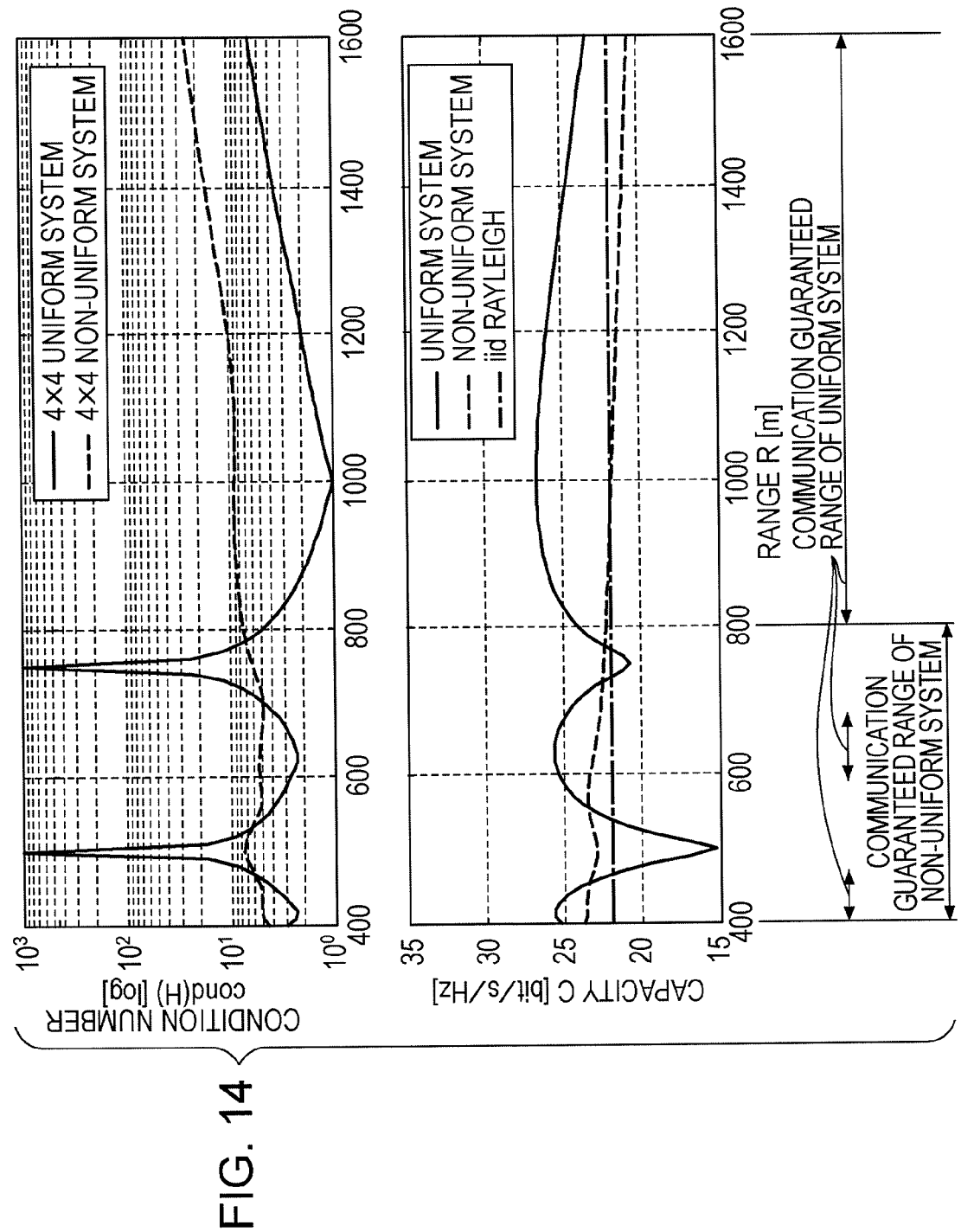
FIG. 14 is a diagram illustrating a simulation result when "$d_{12}=0.25d$" and "N=4" are satisfied.

FIG. 14 is a diagram illustrating a simulation result for the non-uniform system when "$d_{12}$=0.25d" and "N=4" are satisfied. Here, "$d_{12}$" indicates the distance between the first and second antenna elements from the end position. For comparison, in FIG. 14, a simulation result for the uniform system is also indicated. The simulation result for the uniform system in FIG. 14 is similar to the simulation result for the uniform system in FIG. 4, and the communication guaranteed range in the uniform system is "800 m≤R≤1600 m" (or "R≅400 m or 600 m").

The distance $d_{12}$ between the first and second antenna elements in the non-uniform system is 0.25d. In such a case, when the range R between the transmitter Tx and the receiver Rx corresponds to 900 m or more ("900 m≤R"), the condition number cond(H) becomes larger than 10, and the capacity C falls below the capacity in the case of the independent and identically distributed Rayleigh (iid Rayleigh). When the range R between the transmitter Tx and the receiver Rx is "400 m≤R≤900 m", the condition number cond(H) becomes 10 or less, and the capacity C exceeds the capacity in the case of the independent and identically distributed Rayleigh (iid Rayleigh). Thus, the range in which the communication may be guaranteed in the non-uniform system (communication guaranteed range) is "400 m≤R≤900 m". This range includes the range that is not covered in the case of the uniform system, but does not include a range that corresponds to 900 m or more, so that the range in which the communication with an appropriate quality may be guaranteed (communication guaranteed range) is not expanded as compared with the case in which the antenna elements are arranged at equal intervals.

Figure 15:
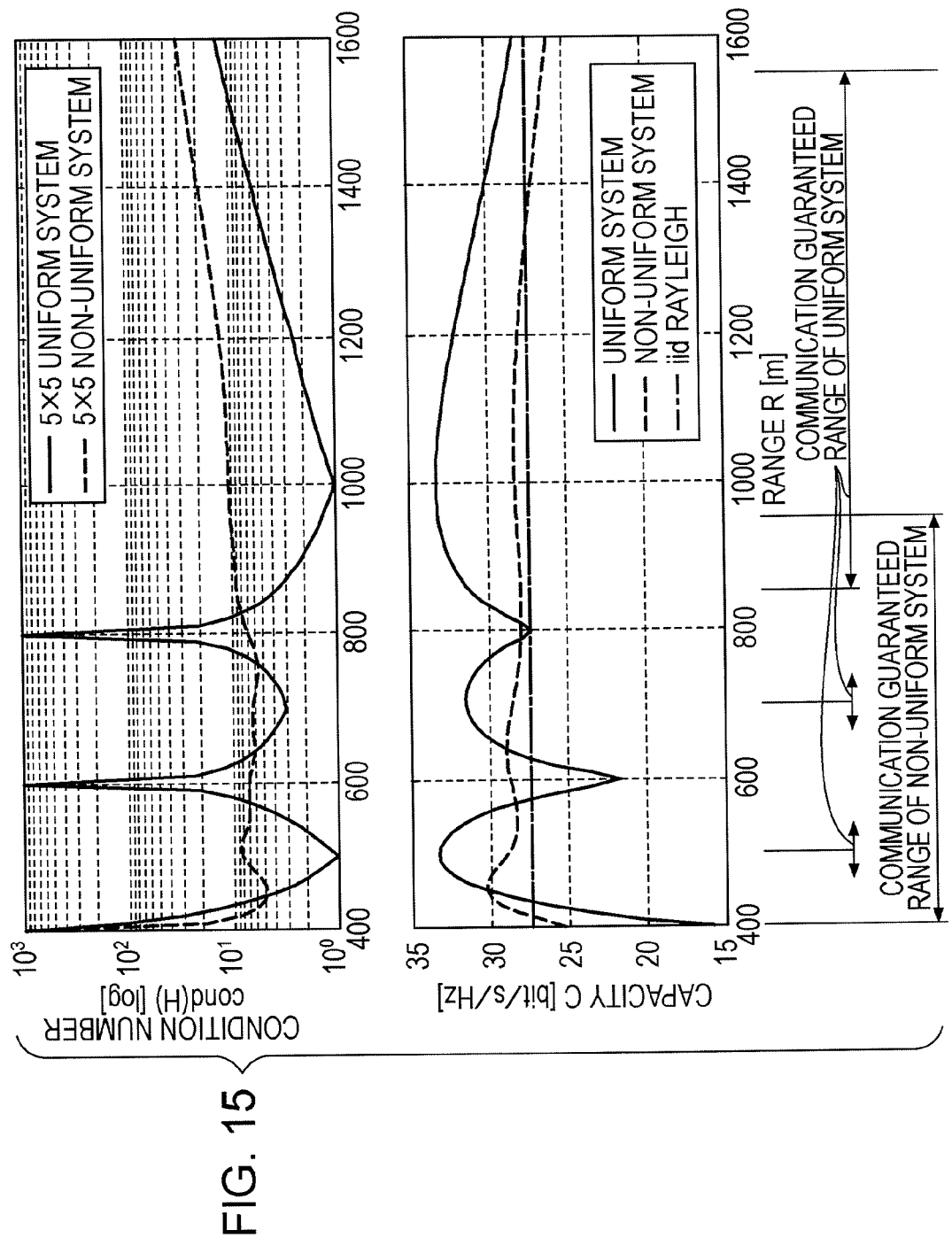
FIG. 15 is a diagram illustrating a simulation result when "$d_{12}=0.25d$" and "N=5" are satisfied.

FIG. 15 is a diagram illustrating a simulation result for the non-uniform system when "$d_{12}$=0.25d" and "N=5" are satisfied. A simulation result for the uniform system in FIG. 15 is similar to the simulation result for the uniform system in FIG. 6, and the communication guaranteed range in the uniform system is "850 m≤R≤1550 m" (or "R≅500 m or 700 m").

The distance $d_{12}$ between the first and second antenna elements in the non-uniform system is 0.25d. In such a case, when the range R between the transmitter Tx and the receiver Rx corresponds to 950 m or more ("95≤R"), the condition number cond(H) becomes larger than 10. In such a range, the capacity C exceeds the capacity in the case of the independent and identically distributed Rayleigh (iid Rayleigh) in "420 m≤R≤1300 m". When the range R between the transmitter Tx and the receiver Rx is "400 m≤R≤950 m", the condition number cond(H) becomes 10 or less, and the capacity C exceeds the capacity in the case of the independent and identically distributed Rayleigh (iid Rayleigh). Thus, the range in which the communication may be guaranteed in the non-uniform system (communication guaranteed range) is "400 m≤R≤950 m". This range includes the range that is not covered in the case of the uniform system, but does not include a range R corresponds to 950 m or more, so that the range in which the communication with an appropriate quality may be guaranteed (communication guaranteed range) is not extended as compared with the case in which the antenna elements are arranged at equal intervals.

Figure 16:
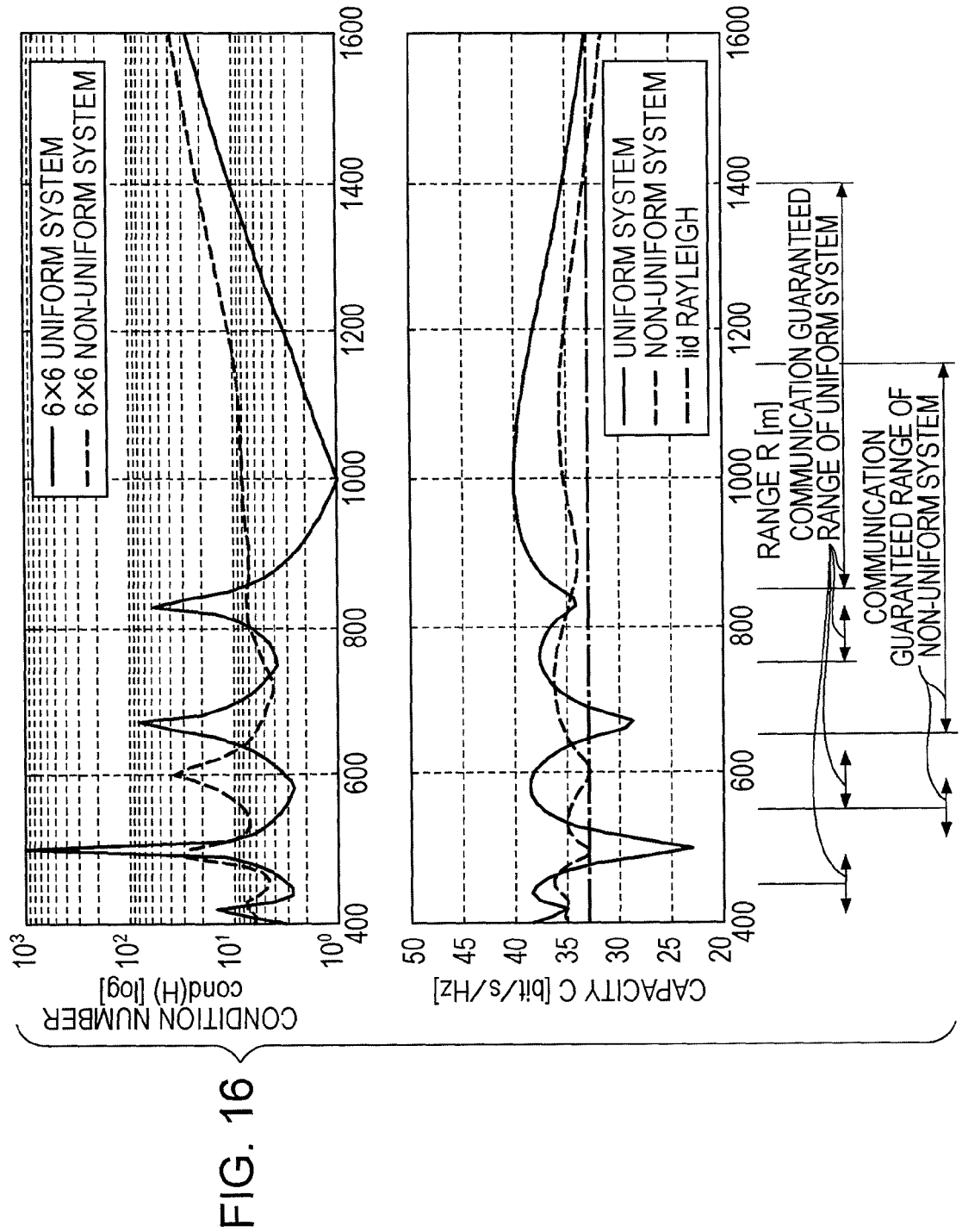
FIG. 16 is a diagram illustrating a simulation result when "$\alpha=-0.2$ ($d_{12}=0.3d$)" and "N=6" are satisfied.

FIG. 16 is a diagram illustrating a simulation result for the non-uniform system when "α=−0.2 ($d_{12}$=0.3d)" and "N=6" are satisfied. A simulation result for the uniform system in FIG. 16 is similar to the simulation result for the uniform system in FIG. 7, and the communication guaranteed range in the uniform system is "850 m≤R≤1400 m" (or "R≅450 m, 550 m, or 750 m").

The distance $d_{12}$ between the first and second antenna elements in the non-uniform system is 0.3d. In such a case, when the range R between the transmitter Tx and the receiver Rx corresponds to 1150 m or more ("1150≤R"), the condition number cond(H) becomes larger than 10, and the capacity C exceeds the capacity in the case of the independent and identically distributed Rayleigh (iid Rayleigh) in "400 m≤R≤1450 m". When the range R between the transmitter Tx and the receiver Rx is "650 m≤R≤1150 m", the condition number cond(H) becomes 10 or less, and the capacity C exceeds the capacity in the case of the independent and identically distributed Rayleigh (iid Rayleigh). When the range R between the transmitter Tx and the receiver Rx is "400 m≤R≤650 m", there is a case in which the condition number cond(H) exceeds 10, and indicates a peak at 600 m and 500 m. In addition, when the range R is around 550 m, the condition number cond(H) becomes 10 or less, and the capacity C exceeds the capacity in the case of the independent and identically distributed Rayleigh (iid Rayleigh). Thus, the range in which the communication is guaranteed in the non-uniform system (communication guaranteed range) is "650 m≤R≤1150 m" (or "R≅550 m"). This range includes the range that is not covered in the case of the uniform system, but does not include a range that corresponds to 1150 m or more, so that the range in which the communication with an appropriate quality may be guaranteed (communication guaranteed range) is not extended as compared with the case in which the antenna elements are arranged at equal intervals.

Figure 17:
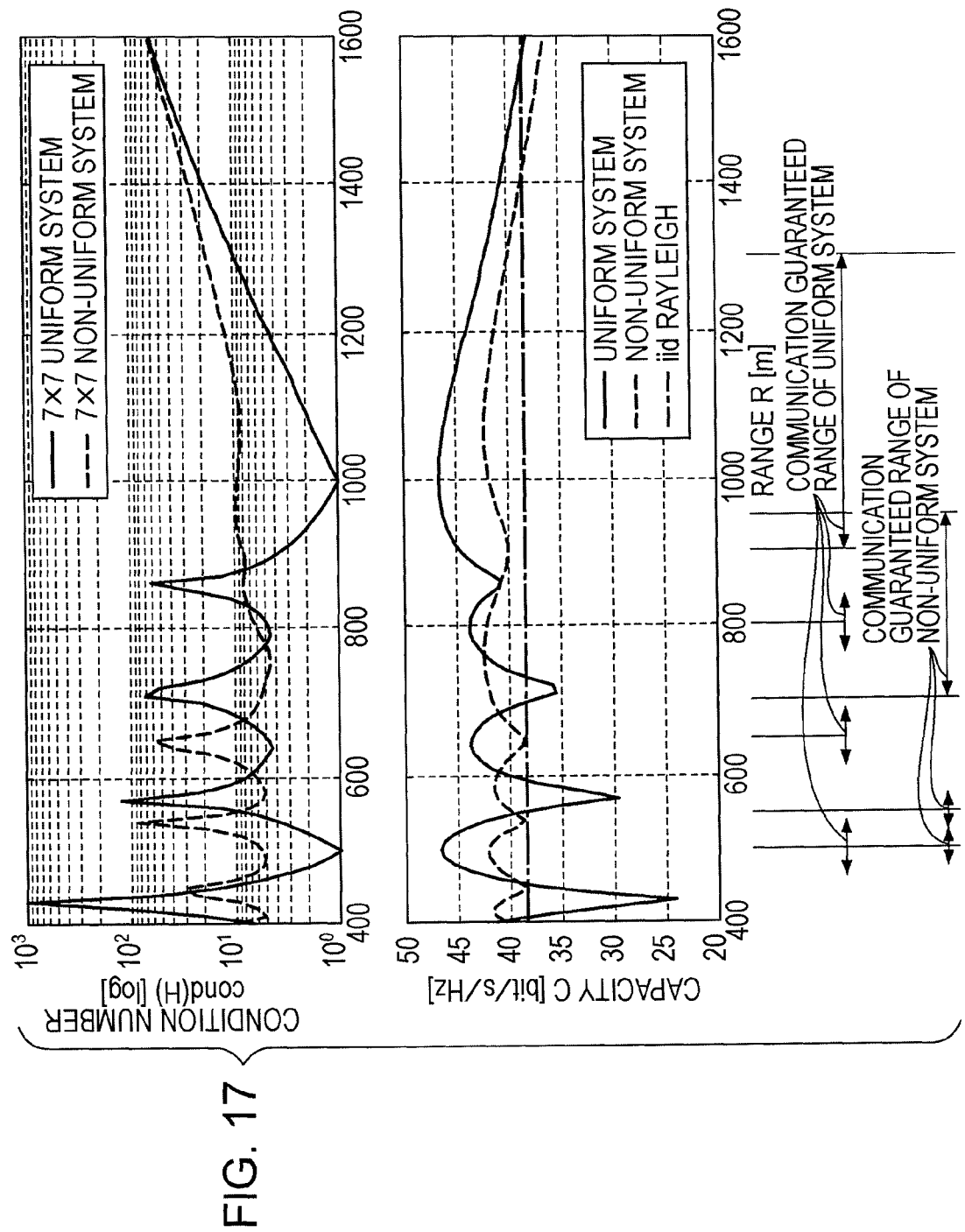
FIG. 17 is a diagram illustrating a simulation result when "$\alpha=-0.2$ ($d_{12}=0.3d$)" and "N=7" are satisfied.

FIG. 17 is a diagram illustrating a simulation result for the non-uniform system when "α=−0.2 ($d_{12}$=0.3d)" and "N=7" are satisfied. A simulation result for the uniform system in FIG. 17 is similar to the simulation result for the uniform system in FIG. 8, and the communication guaranteed range in the uniform system is "900 m≤R≤1300 m" (or "R≅500 m, 650 m, or 800 m").

The distance $d_{12}$ between the first and second antenna elements in the non-uniform system is 0.3d. In such a case, when the range R between the transmitter Tx and the receiver Rx corresponds to 950 m or more ("950≤R"), the condition number cond(H) becomes approximately larger than 10, but the capacity C exceeds the capacity in the case of the independent and identically distributed Rayleigh (iid Rayleigh) in "400 m≤R≤11450 m". When the range R between the transmitter Tx and the receiver Rx is "700 m≤R≤1950 m", the condition number cond(H) becomes 10 or less, and the capacity C exceeds the capacity in the case of the independent and identically distributed Rayleigh (iid Rayleigh). When the range R between the transmitter Tx and the receiver Rx is "400 m≤R≤700 m", there is a case in which the condition number cond(H) exceeds 10, and indicates a peak at 650 m, 550 m and 450 m. In addition, when the range R is around 500 m or 550 m, the condition number cond(H) becomes 10 or less, and the capacity C exceeds the capacity in the case of the independent and identically distributed Rayleigh (iid Rayleigh). Thus, the range in which the communication may be guaranteed in the non-uniform system (communication guaranteed range) is "700 m≤R≤950 m" (or "R≅500 m or 550 m"). This range includes the range that is not covered in the uniform system, but does not include a range that corresponds to 950 m or more, so that the range in which the communication with an appropriate quality may be guaranteed (communication guaranteed range) is not extended as compared with the case in which the antenna elements are arranged at equal intervals.

Figure 18:
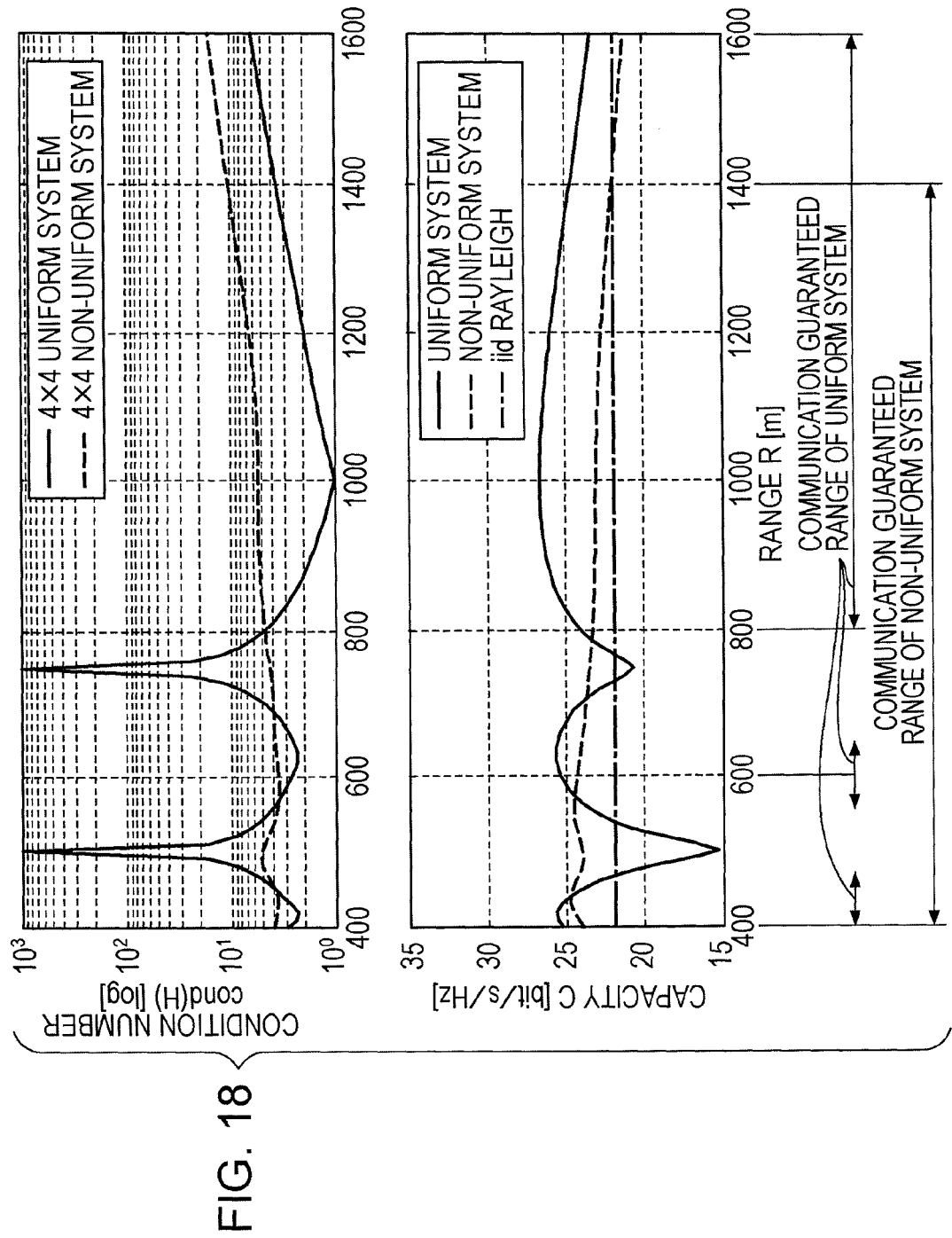
FIG. 18 is a diagram illustrating a simulation result when "$d_{12}=d/3=0.333d$" and "N=4" are satisfied.

FIG. 18 is a diagram illustrating a simulation result for the non-uniform system when "$d_{12}$=d/3=0.333d" and "N=4" are satisfied. A simulation result for the uniform system in FIG. 18 is similar to the simulation result for the uniform system in FIGS. 4 and 14, and the communication guaranteed range in the uniform system is "800 m≤R≤1600 m" (or "R≅400 m or 600 m").

The distance $d_{12}$ between the first and second antenna elements in the non-uniform system is d/3=0.333d. In such a case, when the range R between the transmitter Tx and the receiver Rx corresponds to 1400 m or more ("1400≤R"), the condition number cond(H) becomes larger than 10, and the capacity C falls below the capacity in the case of the independent and identically distributed Rayleigh (iid Rayleigh). When the range R between the transmitter Tx and the receiver Rx is "400 m≤R≤1400 m", the condition number cond(H) becomes 10 or less, and the capacity C exceeds the capacity in the case of the independent and identically distributed Rayleigh (iid Rayleigh). Thus, the range in which the communication may be guaranteed in the non-uniform system (communication guaranteed range) corresponds to 400 m≤R≤1400 m. This range does not include a part ("1400 m≤R") of the range that is covered in the case of the uniform system, but the range in which the communication with an appropriate quality may be guaranteed (communication guaranteed range) is greatly extended.

Figure 19:
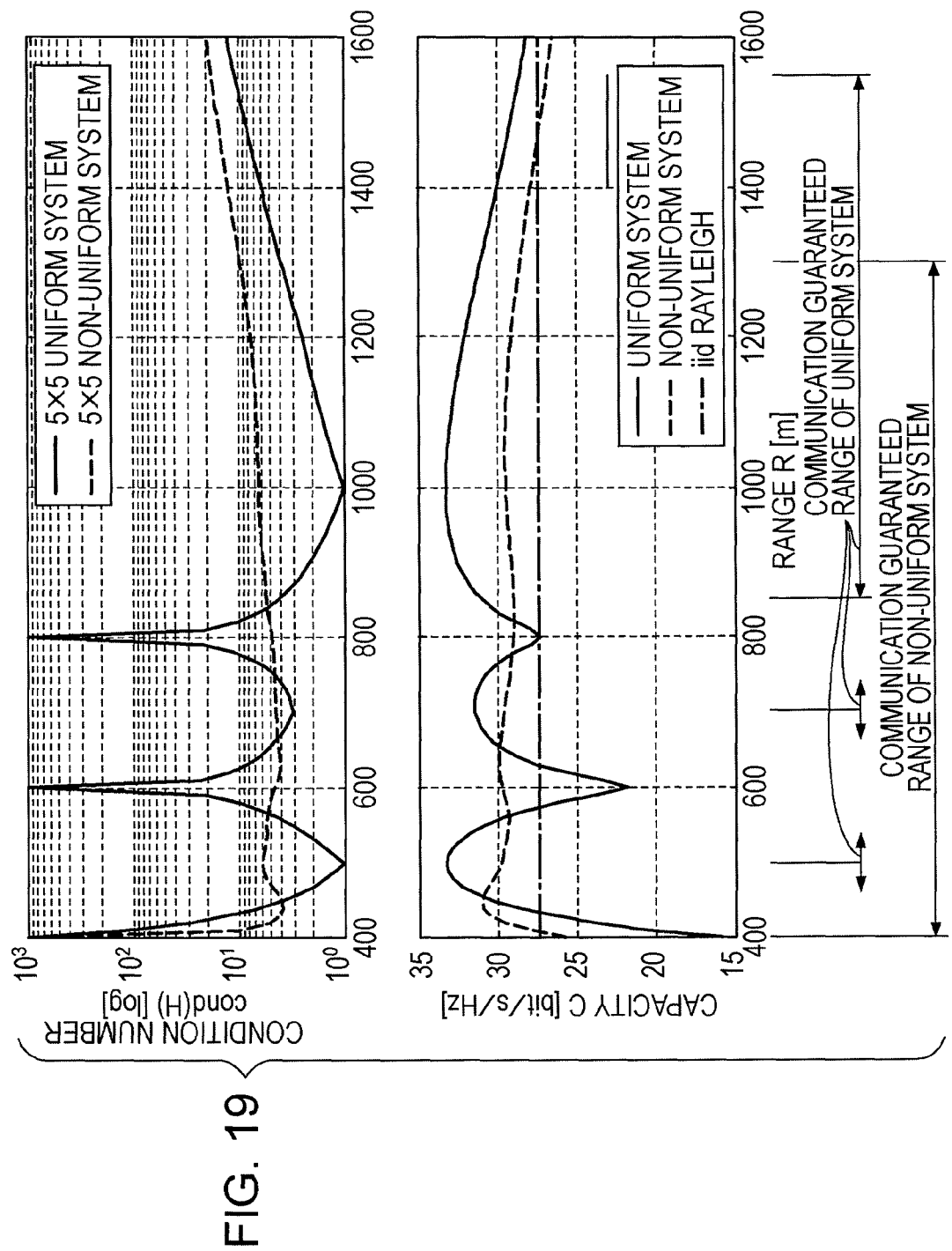
FIG. 19 is a diagram illustrating a simulation result when "$d_{12}=d/3=0.333d$" and "N=5" are satisfied.

FIG. 19 is a diagram illustrating a simulation result for the non-uniform system when "$d_{12}$=d/3=0.333d" and "N=5" are satisfied. A simulation result for the uniform system in FIG. 19 is similar to the simulation result for the uniform system in FIGS. 6 and 15, and the communication guaranteed range in the uniform system is "850 m≤R≤1550 m" (or "R≅500 m or 700 m").

The distance $d_{12}$ between the first and second antenna element in the non-uniform system is "d/3=0.333d". In such a case, when the range R between the transmitter Tx and the receiver Rx corresponds to 1300 m or more ("1300≤R"), the condition number cond(H) becomes larger than 10, and the capacity C exceeds the capacity in the case of the independent and identically distributed Rayleigh (iid Rayleigh) in "420 m≤R≤1450 m". Thus, the range in which the communication may be guaranteed in the non-uniform system (communication guaranteed range) is "420 m≤R≤1300 m". This range does not include a part ("1300 m≤R≤1550 m") of the range that is covered in the uniform system, but the range in which the communication with an appropriate quality may be guaranteed (communication guaranteed range) is greatly extended.

Figure 20:
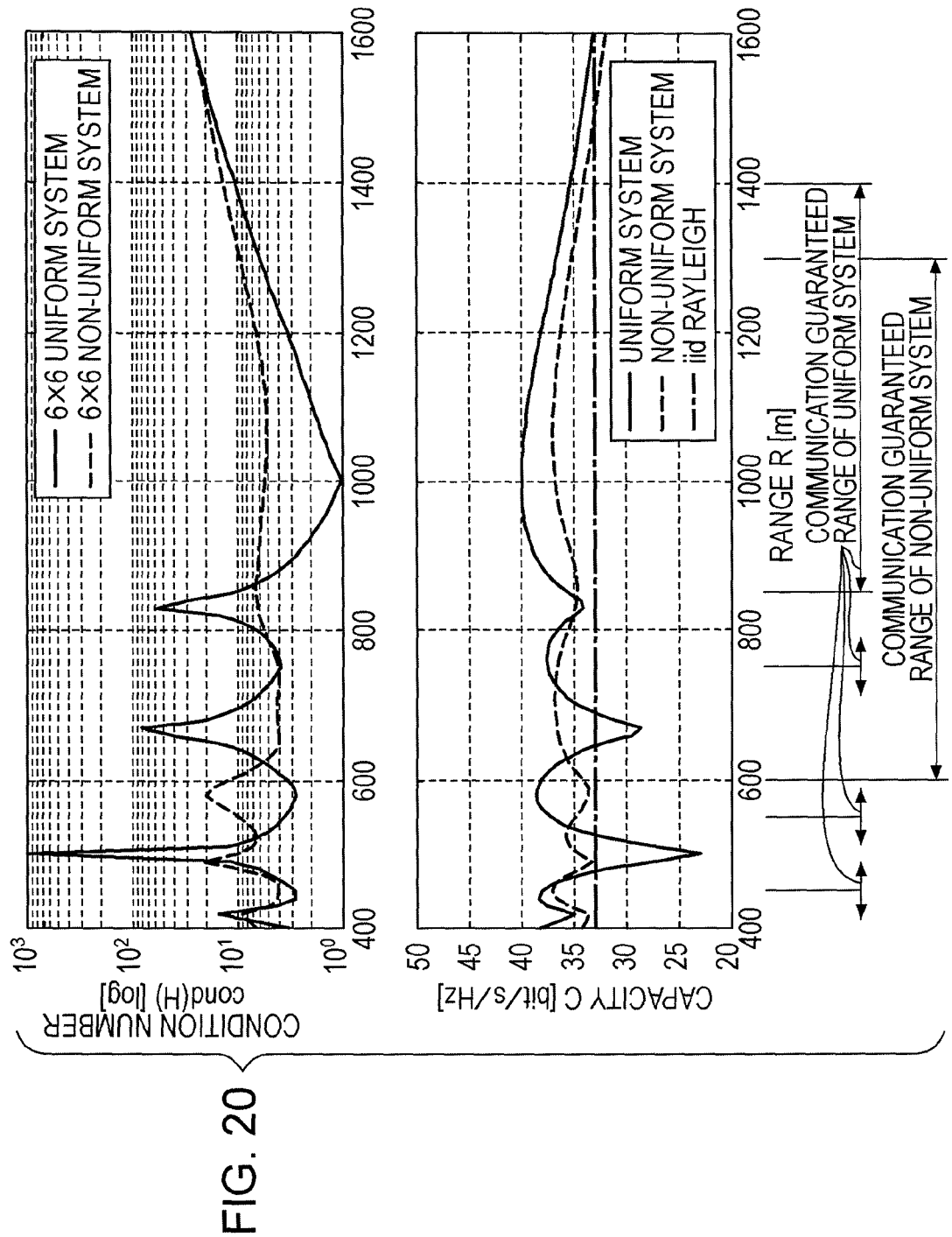
FIG. 20 is a diagram illustrating a simulation result when "$\alpha=-0.1$ ($d_{12}=0.4d$)" and "N=6" are satisfied.

FIG. 20 is a diagram illustrating a simulation result for the non-uniform system when "α=−0.1 ($d_{12}$=0.4d)" and "N=6" are satisfied. A simulation result for the uniform system in FIG. 20 is similar to the simulation result for the uniform system in FIGS. 7 and 16, and the communication guaranteed range in the uniform system is "850 m≤R≤1400 m" (or "R≅450 m, 550 m, or 750 m").

The distance $d_{12}$ between the first and second antenna elements in the non-uniform system is 0.4d. In such a case, when the range R between the transmitter Tx and the receiver Rx corresponds to 1300 m or more ("1300 m≤R"), the condition number cond(H) becomes larger than 10, and the capacity C exceeds the capacity in the case of the independent and identically distributed Rayleigh (iid Rayleigh) in "400 m≤R≤1300 m". When the range R between the transmitter Tx and the receiver Rx is "600 m≤R1300 m", the condition number cond(H) becomes 10 or less, and the capacity C exceeds the capacity in the case of the independent and identically distributed Rayleigh (iid Rayleigh). When the range R between the transmitter Tx and the receiver Rx is "R≤600 m", there is a case in which the condition number cond(H) exceeds 10, and indicates a peak at 580 m and 500 m. Thus, the range in which the communication may be guaranteed in the non-uniform system (communication guaranteed range) is "600 m≤R≤1300 m". This range does not include a part ("1300 m≤R≤1400 m") of the range that is covered in the uniform system, but includes almost all of the range that is covered in the uniform system, and the range in which the communication with an appropriate quality may be guaranteed (communication guaranteed range) is greatly extended.

Figure 21:
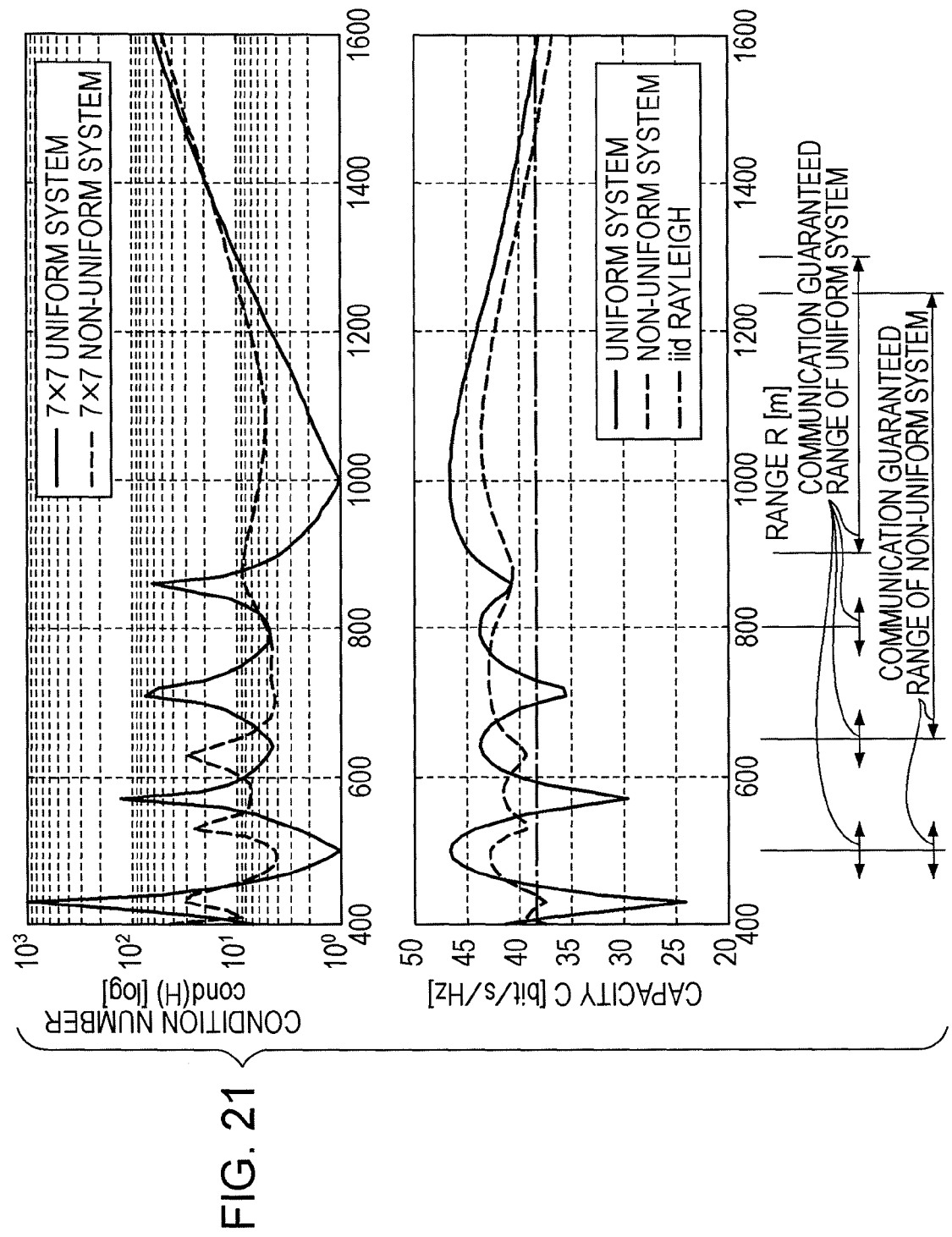
FIG. 21 is a diagram illustrating a simulation result when "$\alpha=-0.1$ ($d_{12}=0.4d$)" and "N=7" are satisfied.

FIG. 21 is a diagram illustrating a simulation result for the non-uniform system when "α=−0.1 ($d_{12}$=0.4d)" and "N=7" are satisfied. A simulation result for the uniform system in FIG. 21 is similar to the simulation result for the uniform system in FIGS. 8 and 17, and the communication guaranteed range in the uniform system is "900 m≤R≤1300 m" (or "R≅500 m, 650 m, or 800 m").

The distance $d_{12}$ between the first and second antenna elements in the non-uniform system is 0.4d. In such a case, when the range R between the transmitter Tx and the receiver Rx corresponds to 1250 m or more ("1250 m≤R"), the condition number cond(H) becomes substantially larger than 10, and the capacity C exceeds the capacity in the case of the independent and identically distributed Rayleigh (iid Rayleigh) in "450 m≤R≤1500 m". When the range R between the transmitter Tx and the receiver Rx is "650 m≤R≤1250 m", the condition number cond(H) becomes 10 or less, and the capacity C exceeds the capacity in the case of the independent and identically distributed Rayleigh (iid Rayleigh). When the range R between the transmitter Tx and the receiver Rx is "400 m≤R≤650 m", there is a case in which the condition number cond(H) exceeds 10, and indicates a peak at 630 m, 530 m and 430 m. In addition, when the range R is around 500 m, the condition number cond(H) becomes 10 or less, and the capacity C exceeds the capacity in the case of the independent and identically distributed Rayleigh (iid Rayleigh). Thus, the range in which the communication may be guaranteed in the non-uniform system (communication guaranteed range) is "650 m≤R≤1250 m" (or "R≅500 m"). This range does not include a part ("1250 m≤R≤1300 m") of the range that is covered in the case of uniform system, but includes almost all of the range that is covered in the case of the uniform system, and the range in which the communication with an appropriate quality may be guaranteed (communication guaranteed range) is greatly extended.

Figure 22:
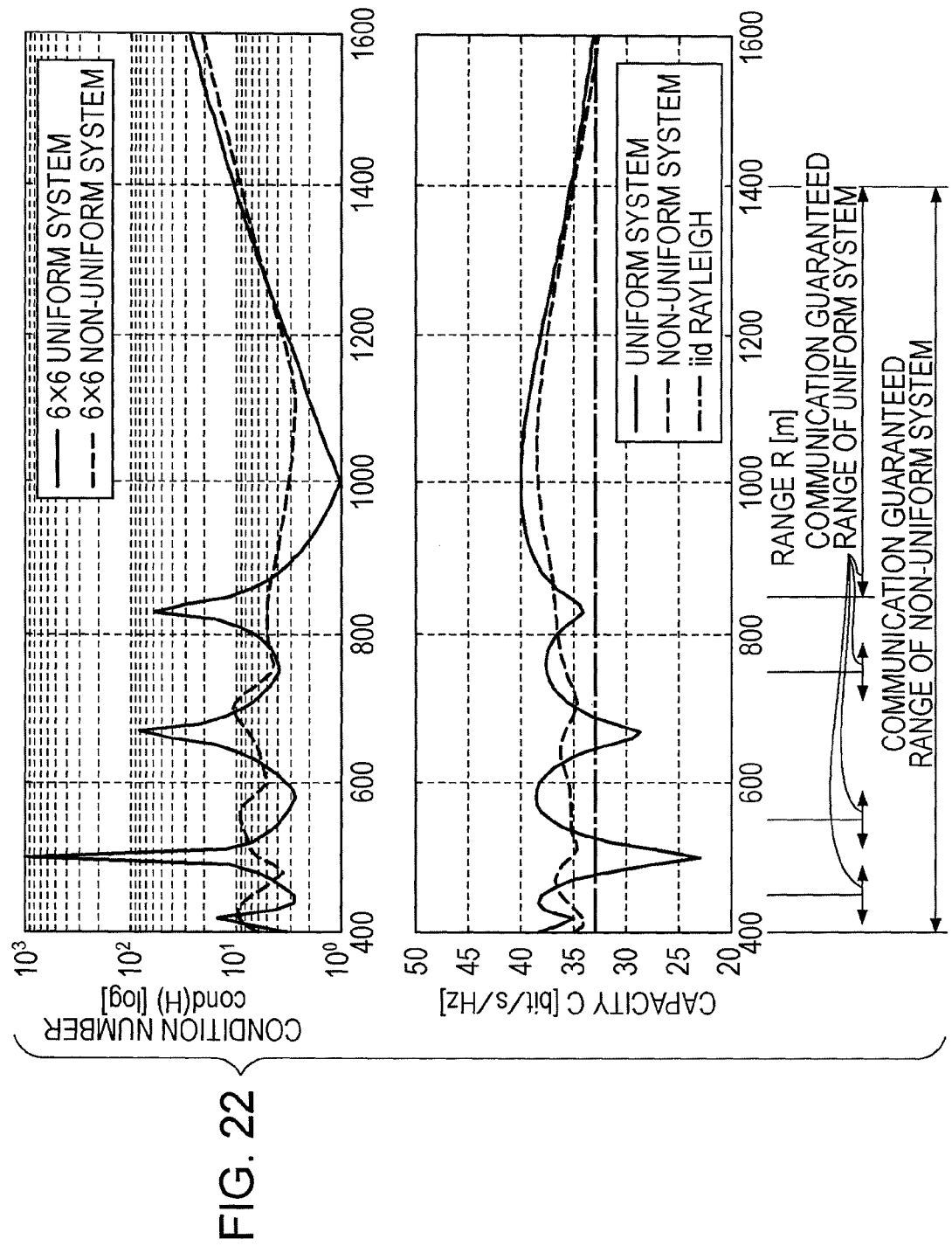
FIG. 22 is a diagram illustrating a simulation result when "$\alpha=+0.1$ ($d_{12}=0.6d$)" and "N=6" are satisfied.

FIG. 22 is a diagram illustrating a simulation result for the non-uniform system when "α+0.1($d_{12}$=0.6d)" and "N=6" are satisfied. A simulation result for the uniform system in FIG. 22 is similar to the simulation result for the uniform system in FIGS. 7 and 16, and the communication guaranteed range in the uniform system is "850 m≤R≤1400 m" (or "R≅450 m, 550 m, or 750 m").

The distance $d_{12}$ between the first and second antenna elements in the non-uniform system is 0.6d. In such a case, when the range R between the transmitter Tx and the receiver Rx corresponds to 1400 m or more ("1400 m≤R"), the condition number cond(H) becomes larger than 10, and the capacity C exceeds the capacity in the case of the independent and identically distributed Rayleigh (iid Rayleigh) in "400 m≤R≤1600 m". When the range R between the transmitter Tx and the receiver Rx is "400 m≤R≤1400 m", the condition number cond(H) becomes 10 or less, and the capacity C exceeds the capacity in the case of the independent and identically distributed Rayleigh (iid Rayleigh). Thus, the range in which the communication may be guaranteed in the non-uniform system (communication guaranteed range) is "400 m≤R≤1400 m", and the range in which the communication with an appropriate quality may be guaranteed (communication guaranteed range) is greatly extended as compared with the case in which the antenna elements are arranged at equal intervals.

Figure 23:
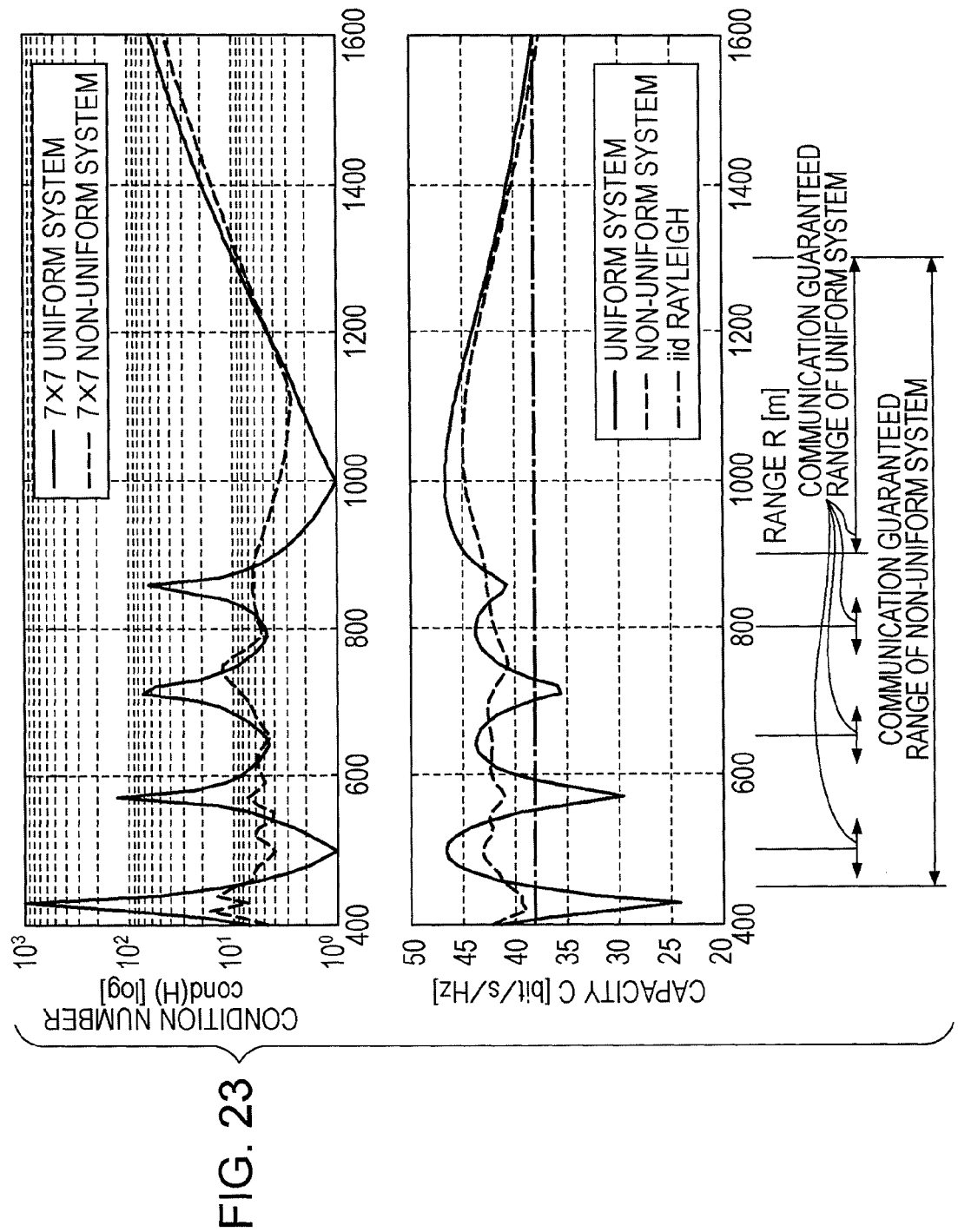
FIG. 23 is a diagram illustrating a simulation result when "$\alpha=+0.1$ ($d_{12}=0.6d$)" and "N=7" are satisfied.

FIG. 23 is a diagram illustrating a simulation result for the non-uniform system when "α=+0.1($d_{12}$=0.6d)" and "N=7" are satisfied. A simulation result for the uniform system in FIG. 23 is similar to the simulation result for the uniform system in FIGS. 8 and 17, and the communication guaranteed range in the uniform system is "900 m≤R≤1300 m" (or "1500 m, 650 m, or 800 m").

The distance $d_{12}$ between the first and second antenna elements in the non-uniform system is 0.6d. In such a case, when the range R between the transmitter Tx and the receiver Rx corresponds to 1300 m or more ("1300 m≤R"), the condition number cond(H) becomes substantially larger than 10, and the capacity C exceeds the capacity in the case of the independent and identically distributed Rayleigh (iid Rayleigh) in "450 m≤R≤1550 m". When the range R between the transmitter Tx and the receiver Rx is "760 m≤R≤1300 m", the condition number cond(H) becomes 10 or less, and the capacity C exceeds the capacity in the case of the independent and identically distributed Rayleigh (iid Rayleigh). Here, when the range R is around 750 m, the condition number becomes slightly larger than 10, but the condition number cond(H) becomes 10 or less even in "450 m≤R≤1720 m". Thus, the range in which the communication may be guaranteed in the non-uniform system (communication guaranteed range) is "450 m≤R≤1300 m", and the range in which the communication with an appropriate quality may be guaranteed (communication guaranteed range) is greatly extended as compared with the case in which the antenna elements are arranged at equal intervals.

Figure 24:
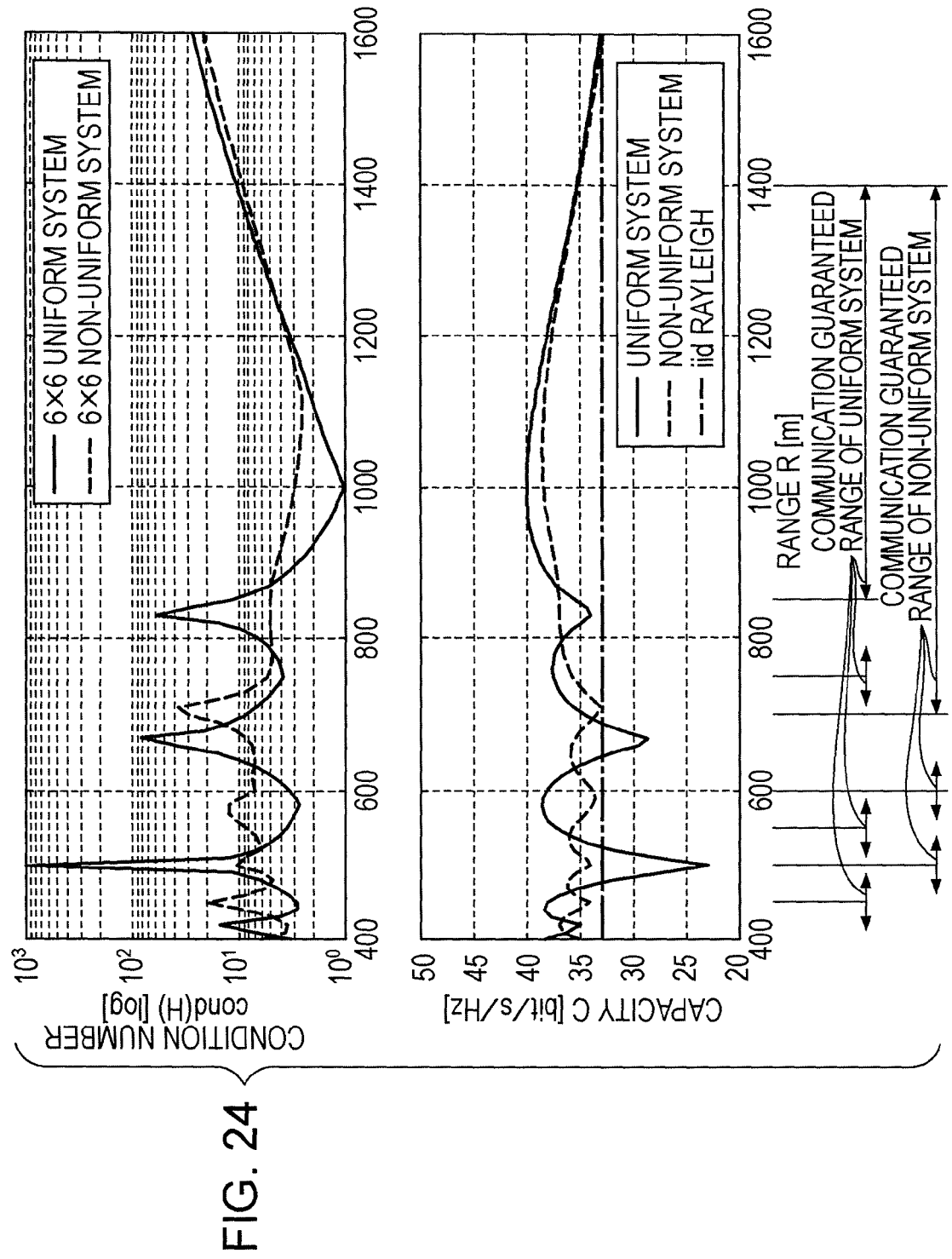
FIG. 24 is a diagram illustrating a simulation result when "$\alpha=+0.2$ ($d_{12}=0.7d$)" and "N=6" are satisfied.

FIG. 24 is a diagram illustrating a simulation result for the non-uniform system when "α=+0.2 ($d_{12}$=0.7d)" and "N=6" are satisfied. A simulation result for the uniform system in FIG. 24 is similar to the simulation result for the uniform system in FIGS. 7 and 16, and the communication guaranteed range in the uniform system is "850 m≤R≤1400 m" (or "R≅450 m, 550 m, or 750 m").

The distance $d_{12}$ between the first and second antenna elements in the non-uniform system is 0.7d. In such a case, when the range R between the transmitter Tx and the receiver Rx corresponds to 1400 m or more ("1400 m≤R"), the condition number cond(H) becomes larger than 10, and the capacity C exceeds the capacity in the case of the independent and identically distributed Rayleigh (iid Rayleigh) in "400 m≤R≤1600 m". When the range R between the transmitter Tx and the receiver Rx is "720 m≤R≤1400 m", the condition number cond(H) becomes 10 or less, and the capacity C exceeds the capacity in the case of the independent and identically distributed Rayleigh (iid Rayleigh). When the range R is 720 m or less, there is a case in which the condition number cond(H) becomes more than 10, and indicates a peak at 700 m, 580 m, 500 m, and 430 m. In addition, when the range R is around 500 m or 600 m, the condition number cond(H) becomes 10 or less, and the capacity C exceeds the capacity in the case of the independent and identically distributed Rayleigh (iid Rayleigh). Thus, the range in which the communication may be guaranteed in the non-uniform system (communication guaranteed range) is "720 m≤R≤1400 m" (or "R≅500 m or 600 m"), and the range in which the communication with an appropriate quality may be guaranteed (communication guaranteed range) is slightly extended as compared with the case in which the antenna elements are arranged at equal intervals.

Figure 25:
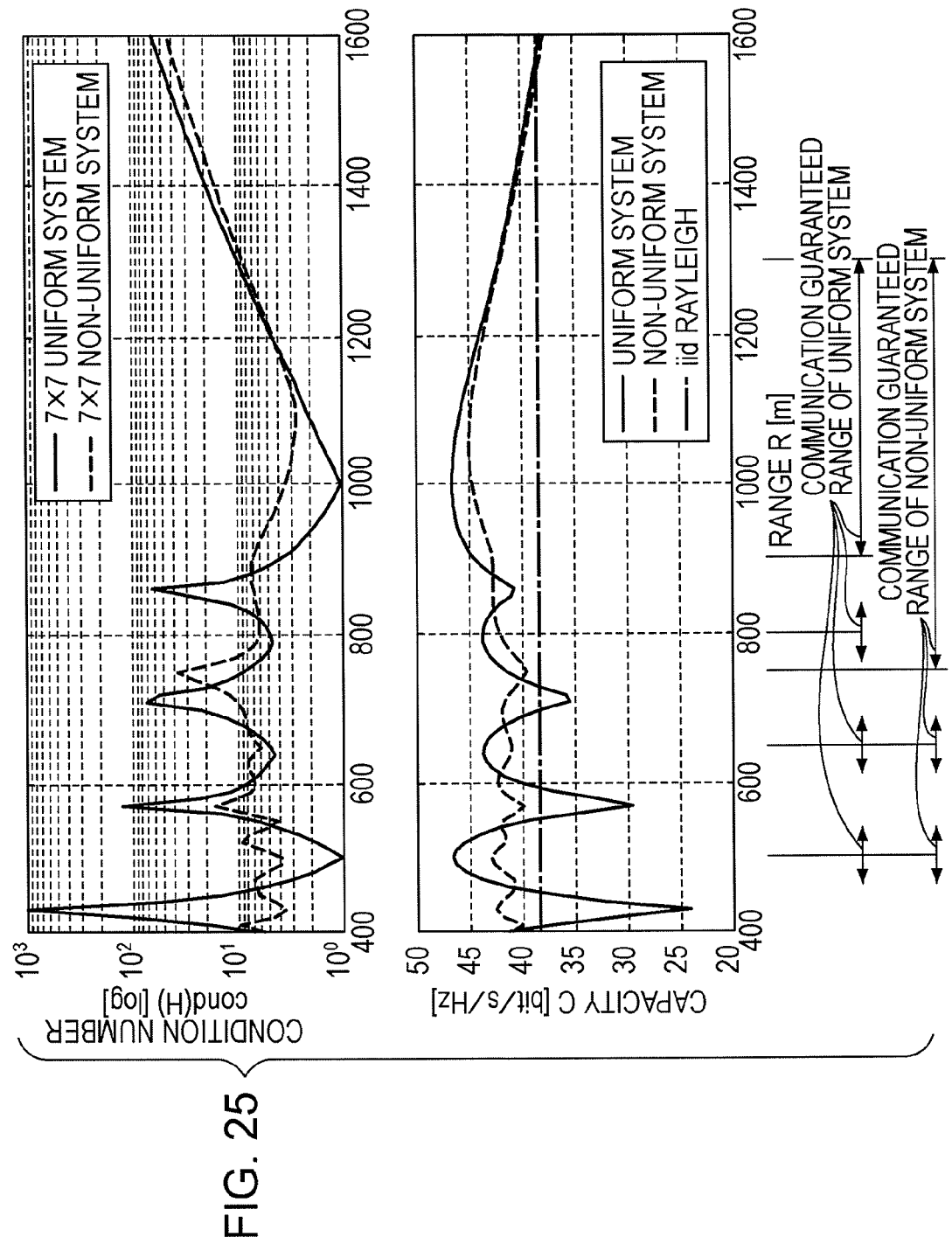
FIG. 25 is a diagram illustrating a simulation result when "$\alpha=+0.2$ ($d_{12}=0.7d$)" and "N=7" are satisfied.

FIG. 25 is a diagram illustrating a simulation result for the non-uniform system when "α=+0.2($d_{12}$=0.7d)" and "N=7"

are satisfied. A simulation result for the uniform system in FIG. 25 is similar to the simulation result for the uniform system in FIGS. 8 and 17, and the communication guaranteed range in the uniform system is "900 m≤R≤1300 m" (or "R≅500 m, 650 m, or 800 m").

The distance $d_{12}$ between the first and second antenna elements in the non-uniform system is 0.7d. In such a case, when the range R between the transmitter Tx and the receiver Rx corresponds to 1300 m or more ("1300 m≤R"), the condition number cond(H) becomes substantially larger than 10, and the capacity C exceeds the capacity in the case of the independent and identically distributed Rayleigh (iid Rayleigh) in "450 m≤R≤1550 m". When the range R between the transmitter Tx and the receiver Rx is "780 m≤R≤1300 m", the condition number cond(H) becomes 10 or less, and the capacity C exceeds the capacity in the case of the independent and identically distributed Rayleigh (iid Rayleigh). When the range R between the transmitter Tx and the receiver Rx corresponds to 780 m or less ("R≤1780 m"), there is a case in which the condition number cond(H) exceeds 10, and indicates a peak at 750 m and 580 m. In addition, when the range R is around 500 m or 650 m, the condition number cond(H) becomes 10 or less, and the capacity C exceeds the capacity in the case of the independent and identically distributed Rayleigh (iid Rayleigh). Thus, the range in which the communication may be guaranteed in the non-uniform system (communication guaranteed range) is "780 m≤R≤1300 m" (or "R≅500 m or 650 m"), and the range in which the communication with an appropriate quality may be guaranteed (communication guaranteed range) is slightly extended as compared with the case in which the antenna elements are arranged at equal intervals.

FIG. 26 is diagram illustrating the simulation results illustrated in FIGS. 4, 6 to 8, and 14 to 25 that are classified from a viewpoint of the distance $d_{12}$ between the antenna elements and the number of antenna elements N. In FIG. 26, the double circle indicates that the communication guaranteed range in the non-uniform system is greatly extended as compared with the uniform system. The circle in FIG. 26 indicates that the communication guaranteed range in the non-uniform system is extended as compared with the uniform system. The triangle in FIG. 26 indicates that the communication guaranteed range in the non-uniform system does not completely cover the communication guaranteed range in the uniform system (the communication guaranteed range in the non-uniform system partially covers the communication guaranteed range in the uniform system). In addition, the cross mark in FIG. 26 indicates that the communication guaranteed range in the non-uniform system is not appropriately extended as compared with the uniform system. Not all of the combinations of parameters are described in FIG. 26, but at least, it is indicated that the communication guaranteed range may be extended when the distance $d_{12}$ between the first and second antenna elements from the end position corresponds to a certain extent that includes 0.5d, in addition to 0.5d. For example, the distance $d_{12}$ is "0.33d≤$d_{12}$≤0.7d" as an example, and preferably is "$d_{12}$=0.4, 0.5 and 0.6". From a viewpoint of the variable parameter a ($d_{12}$=(1/2+α)d), the variable parameter α is preferably "−0.2≤α≤0.2", and is further preferably "−0.15≤α≤0.15", and is further preferably "−0.1≤α≤0.1". Thus, a distance between the first and second antenna elements from the end position is not strictly limited to "d/2", and may be practically equal to "d/2". That is, the distance $d_{12}$ between the first and second antenna elements from the end position may be equal to "(1/2+α)d". Similarly, a distance between antenna elements other than the first and second antenna elements from the end position is not strictly limited to "d", and may be practically equal to "d", that is, equal to (1+α)d.

As described above, the communication by the SDM scheme in the LOS environment is described, and the embodiments may be applied to an example in which the arrangement of the second antenna element from the end position from among the plurality of antenna elements is merely non-uniform. The embodiments are not limited to the detailed-described examples, and various modifications, corrections, alterations, substitutions, and the like are allowed to be made by those skilled in the art. The description has been made using the specific numerical examples in order to facilitate understanding of the embodiments, but unless otherwise noted, these numerical values are merely examples and any other appropriate values may be used. In addition, the description has been made using the specific formulas in order to facilitate understanding of the embodiments, but unless otherwise noted, the formulas are merely examples, and the other formulas that provide similar results may be used. The embodiments are not limited to the above-described classification of the items, and matters that are described in two or more items may be combined as appropriate and used, and a matter that is described in a certain item may be applied to a matter that is described in another item (unless contradictory). Various modifications, corrections, alterations, substitutions, and the like for the above-described specific embodiments are included in the range of the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
    a transmitter configured to include a plurality of transmission antenna elements that are arranged in a row, and to transmit a signal by a space division multiplexing scheme; and
    a receiver configured to include a plurality of reception antenna elements that are arranged in a row, and to receive a signal by the space division multiplexing scheme, wherein:
    the plurality of transmission antenna elements includes a first transmission antenna element, a second transmission antenna element, and a third transmission antenna element;
    the first transmission antenna element is a terminal transmission antenna element of the plurality of transmission antenna elements, the second transmission antenna element is located next to the first transmission antenna element, and the third transmission antenna element is located next to the second transmission antenna element;
    a distance between the first transmission antenna element and the second transmission antenna element is different from a distance between the second transmission antenna element and the third transmission antenna element;

the plurality of reception antenna elements include a first reception antenna element, a second reception antenna element and a third reception antenna element;

the first reception antenna element is a terminal reception transmission antenna element of the plurality of reception antenna elements, the second reception antenna element is located next to the first reception antenna element, and the third reception antenna element is located next to the second reception antenna element; and a distance between the first reception antenna element and the second reception antenna element is different from a distance between the second reception antenna element and the third reception antenna element.

2. The communication system according to claim 1, wherein:

the distance between the first transmission antenna element and the second transmission antenna element is $(1/2+\alpha_2)d_t$ and the distance between the second transmission antenna element and the third transmission antenna element is $(3/2+\alpha_3)d_t$, where the $d_t$ is a reference distance that is determined from a number of the transmission antenna elements $N_t$ that are included in the plurality of transmission antenna elements, a wavelength $\lambda$ of a signal to be transmitted, and a range R between the transmission antenna elements and the reception antenna elements, the distance between the first reception antenna element and the second reception antenna element is $(1/2+\beta_2)d_r$ and the distance between the second reception antenna element and the third reception antenna element is $(3/2+\beta_3)d_r$, where the $d_r$ is a reference distance that is determined from a number of the reception antenna elements $N_r$ that are included in the plurality of transmission antenna elements, the wavelength $\lambda$, and the range R, and the $\alpha_2, \alpha_3, \beta_2,$ and $\beta_3$ are values within ±0.15.

3. The communication system according to claim 1, wherein the transmitter and the receiver are configured to perform transmission and reception of a signal in a line-of-sight environment by the space division multiplexing scheme.

4. The communication system according to claim 2, wherein:

coordinates of the plurality of transmission antenna elements that are arranged in a row are respectively represented as $0, (1/2+\alpha_2)d_t, (2+\alpha_3)d_t, \ldots, (N_t-2+\alpha_{Nt-1})d_t,$ and $(N_t-1)d_t,$ coordinates of the plurality of reception antenna elements that are arranged in a row are respectively represented as $0, (1/2+\beta_2)d_r, (2+\beta_3)d_r, \ldots, (N_r-2+\beta_{Nr-1})d_r,$ and $(N_r-1)d_r,$ and $\alpha_i$ (i=2, ..., and $N_t-1$) and $\beta_j$ (j=2, ..., and $N_r-1$) are values within ±0.15.

5. The communication system according to claim 2, wherein:

coordinates of the plurality of transmission antenna elements that are arranged in a row are respectively represented as $0, (1/2+\alpha_2)d_t, (2+\alpha_3)d_t, \ldots, (N_t-2+\alpha_{Nt-1})d_t,$ and $(N_t-1)d_t,$ coordinates of the plurality of reception antenna elements that are arranged in a row are respectively represented as $0, (1+\beta_2)d_r, (2+\beta_3)d_r, \ldots, (N_r-2+1/2+\beta_{Nr-1})d_r,$ and $(N_r-1)d_r,$ and $\alpha_i$ (i=2, ..., and $N_t-1$) and $\beta_j$ (j=2, ..., and $N_r-1$) are values within ±0.15.

6. The communication system according to claim 2, wherein:

coordinates of the plurality of transmission antenna elements that are arranged in a row are respectively represented as $0, (1+\alpha_2)d_t, (2+\alpha_3)d_t, \ldots, (N_t-2+1/2+\alpha_{Nt-1})d_t,$ and $(N_t-1)d_t,$ coordinates of the plurality of reception antenna elements that are arranged in a row are respectively represented as $0, (1+\beta_2)d_r, (2+\beta_3)d_r, \ldots, (N_r-2+1/2+\beta_{Nr-1})d_r,$ and $(N_r-1)d_r,$ and $\alpha_i$ (i=2, ..., and $N_t-1$) and $\beta_j$ (j=2, ..., and $N_r-1$) are values within ±0.15.

7. The communication system according to claim 2, wherein:

coordinates of the plurality of transmission antenna elements that are arranged in a row are respectively represented as $0, (1+\alpha_2)d_t, (2+\alpha_3)d_t, \ldots, (N_t-2+1/2+\alpha_{Nt-1})d_t,$ and $(N_t-1)d_t,$ coordinates of the plurality of reception antenna elements that are arranged in a row are respectively represented as $0, (1/2+\beta_2)d_r, (2+\beta_3)d_r, \ldots, (N_r-2+\beta_{Nr-1})d_r,$ and $(N_r-1)d_r,$ and $\alpha_i$ (i=2, ..., and $N_t-1$) and $\beta_j$ (j=2, ..., and $N_r-1$) are values within ±0.15.

8. The communication system according to claim 1, wherein the transmitter and the receiver are fixed base stations.

9. A communication device configured to perform one of signal transmission and signal reception by a space division multiplexing scheme, the communication device comprising:

a plurality of antenna elements that are arranged in a row, wherein:

the plurality of antenna elements include a first transmission antenna element, a second transmission antenna element, and a third transmission antenna element;

the first antenna element is a terminal transmission antenna element of the plurality of antenna elements, the second antenna element is located next to the first antenna element, and the third antenna element is located next to the second antenna element; and a distance between the first antenna element and the second antenna element is different from a distance between the second antenna element and the third antenna element.

10. An antenna element arrangement method that is to be executed by a device to determine an arrangement of a plurality of transmission antenna elements that are arranged in a row in a transmitter configured to transmit a signal by a space division multiplexing scheme and a plurality of reception antenna elements that are arranged in a row in a receiver configured to receive a signal by the space division multiplexing scheme, a number of the transmission antenna elements included in the plurality of transmission antenna elements being equal to a number of the reception antenna elements included in the plurality of reception antenna elements, the antenna element arrangement method comprising:

calculating a reference distance $d_t$ based on the number of the transmission antenna elements or the number of the reception antenna elements, a wavelength $\lambda$ of a signal, and a distance R between the plurality of transmission antenna elements in the transmitter and the plurality of reception antenna elements in the receiver;

arranging, on the transmitter, the plurality of transmission antenna elements in a row at equal intervals by the reference distance $d_t$, the plurality of transmission antenna elements including a first transmission antenna element, a second transmission antenna element, and a third transmission antenna element, the first transmission antenna element being a terminal transmission antenna element of the plurality of transmission antenna elements, the second transmission antenna element being located next to the first transmission antenna element, and the third transmission antenna element being located next to the second transmission antenna element;

shifting a position of the second transmission antenna element so that a distance between the first transmission antenna element and the second transmission antenna element is different from a distance between the second transmission antenna element and the third transmission antenna element;

arranging, on the receiver, the plurality of reception antenna elements in a row at equal intervals by the reference distance $d_t$, the plurality of reception antenna elements including a first reception antenna element, a second reception antenna element, and a third reception antenna element, the first reception antenna element being a terminal reception antenna element of the plurality of reception antenna elements, the second reception antenna element being located next to the first reception antenna element, and the third reception antenna element being located next to the second reception antenna element;

shifting a position of the second reception antenna element such that a distance between the first reception antenna element and the second reception antenna element is different from a distance between the second reception antenna element and the third reception antenna element.

* * * * *